(12) United States Patent
Chidambaram et al.

(10) Patent No.: US 10,824,977 B2
(45) Date of Patent: Nov. 3, 2020

(54) SYSTEMS AND/OR METHODS FOR SECURING AND AUTOMATING PROCESS MANAGEMENT SYSTEMS USING DISTRIBUTED SENSORS AND DISTRIBUTED LEDGER OF DIGITAL TRANSACTIONS

(71) Applicant: SOFTWARE AG, Darmstadt (DE)

(72) Inventors: Vijay Anand Chidambaram, Chennai (IN); Rajesh Kumar Radhakrishnan Varadhan, Chennai (IN); Balaji Thilagar, Chennai (IN); Vijayanand Ravivarman, Chennai (IN)

(73) Assignee: SOFTWARE AG, Darmstadt (DE)

( * ) Notice: Subject to any disclaimer, the term of this patent is extended or adjusted under 35 U.S.C. 154(b) by 175 days.

(21) Appl. No.: 16/137,617

(22) Filed: Sep. 21, 2018

(65) Prior Publication Data

US 2020/0099531 A1 Mar. 26, 2020

Related U.S. Application Data

(63) Continuation of application No. 16/136,780, filed on Sep. 20, 2018.

(51) Int. Cl.
*G06Q 10/06* (2012.01)
*G06Q 20/36* (2012.01)
(Continued)

(52) U.S. Cl.
CPC ... *G06Q 10/06315* (2013.01); *G06Q 10/0633* (2013.01); *G06Q 10/06316* (2013.01);
(Continued)

(58) Field of Classification Search
CPC ....... G06Q 10/06315; G06Q 10/06316; G06Q 10/0633; G06Q 20/3674; H04L 9/0643;
(Continued)

(56) References Cited

U.S. PATENT DOCUMENTS

| | | |
|---|---|---|
| 8,359,224 B2 | 1/2013 | Simon |
| 9,633,087 B2 | 4/2017 | Schoening |

(Continued)

FOREIGN PATENT DOCUMENTS

WO 2018/217788 11/2018

OTHER PUBLICATIONS

IBM—Let's Go Beyond Blockchain Use Cases to Real Blockchain Networks, retrieved Aug. 27, 2018, 4 pages. https://www.ibm.com/blockchain/use-cases/index.html?lnk=pltfrm&sub=ntwrk.

(Continued)

*Primary Examiner* — Christopher C Harris
(74) *Attorney, Agent, or Firm* — Nixon & Vanderhye P.C.

(57) ABSTRACT

An electronic resource tracking and storage computer system communicates with computing systems operated by different participants. Computing systems store copies of a blockchain and have associated computing devices with sensors. A programmed rule set includes conditions to be met when cooperating to complete, in connection with a resource tracked via the blockchain, a modeled process including modeled tasks. A transceiver receives, from the computing devices, signed electronic data messages including identifiers and values from their respective sensors. Blockchain transactions including identifiers and value(s) in the respective messages are generated. Generated blockchain transactions are published for inclusion in blockchain's copies. Value(s) in the respective electronic data messages are validated against the set of programmed rules. Based on the validations' results, events are emitted to an event bus monitored by a management system. These events selectively trigger the management system to automatically implement modeled tasks in dependence on the validations' results.

20 Claims, 19 Drawing Sheets

(51) Int. Cl.
*H04L 9/06* (2006.01)
*H04L 9/32* (2006.01)

(52) U.S. Cl.
CPC ....... *G06Q 20/3674* (2013.01); *H04L 9/0637* (2013.01); *H04L 9/0643* (2013.01); *H04L 9/3247* (2013.01); *H04L 2209/38* (2013.01)

(58) Field of Classification Search
CPC . H04L 9/3247; H04L 9/0637; H04L 2209/38; H04L 9/3239
See application file for complete search history.

(56) References Cited

U.S. PATENT DOCUMENTS

| | | | |
|---|---|---|---|
| 9,641,342 B2 | 5/2017 | Sriram et al. | |
| 9,965,628 B2* | 5/2018 | Ford | G06F 21/554 |
| 2012/0237022 A1* | 9/2012 | Berson | A61B 5/14551 380/28 |
| 2015/0379510 A1 | 12/2015 | Smith | |
| 2018/0115425 A1* | 4/2018 | Dechu | H04L 9/3239 |
| 2018/0365201 A1* | 12/2018 | Hunn | G06Q 10/10 |
| 2019/0013948 A1* | 1/2019 | Mercuri | G06F 9/451 |
| 2019/0340013 A1* | 11/2019 | Cella | G06N 3/0427 |
| 2019/0379699 A1* | 12/2019 | Katragadda | G06N 20/00 |
| 2019/0384839 A1* | 12/2019 | Esposito, II | G06F 16/2365 |
| 2020/0042913 A1 | 2/2020 | Kumar | |
| 2020/0051081 A1 | 2/2020 | Valecha | |
| 2020/0065922 A1* | 2/2020 | Goldstraj | G06Q 50/18 |

OTHER PUBLICATIONS

Sawtooth—Revolutionizing the Supply Chain: Bringing Traceability and Accountability to the Supply Chain Through the Power of Hyperledger Sawtooth's Distributed Ledger Technology, retrieved Aug. 27, 2018, 3 pages. https://sawtooth.hyperledger.org/examples/seafood.html.

BlockGemini—Blockchain Solutions: Custom Blockchain Solutions, retrieved Aug. 29, 2018, 4 pages. https://www.blockgemini.com/blockchain-solutions.html.

TIBCO BPM and Blockchain: Game-Changing Solutions for Secure Transactions, retrieved Aug. 29, 2018, 25 pages. https://www.tibco.com/sites/tibco/files/resources/WP-BPM-hyperledger-final_2.pdf.

Henry M. Kim et al., "Towards an Ontology-Driven Blockchain Design for Supply Chain Provenance," retrieved Aug. 29, 2018, 17 pages.

Konstantinos Christidis et al., "Blockchains and Smart Contracts for the Internet of Things," IEEE Access, Special Section on the Plethora of Research in Internet of Things (IoT), May 10, 2016, 12 pages.

Arshdeep Bahga et al., "Blockchain Platform for Industrial Internet of Things," Journal of Software Engineering and Applications, 9, Oct. 28, 2016, pp. 533-546.

Kari Korpela et al., "Digital Supply Chain Transformation Towards Blockchain Integration," Proceedings of the 50th Hawaii International Conference on System Sciences, Jan. 4, 2017, pp. 4182-4191.

U.S. Appl. No. 16/136,780, filed Sep. 20, 2018, Chidambaram et al.

* cited by examiner

```
{
  "packageID": "vg0oo100btuep4ni0000000v",
  "FromPartnerID": "5o73600bv3746a8000000fj",
  "ToPartnerID": "5o7e606o7qvitp000000uo",
  "SmartContractID": "4368a4e8-c5f1-4ae8-b85f-6da6726630684",
  "ContractBreach": false,
  "BreachedPartner": null,
  "parameters": [
    "DateTime",
    "Temperature",
    "Humidity",
    "pressure",
    "parameter3",
    "parameter4"
  ],
  "parameterValue": [
    {
      "Data": [
        "1510425000000",
        "30",
        "40",
        "45",
        "55",
        "34"
      ]
    },
    {
      "Data": [
        "1510425000000",
        "30",
        "40",
        "45",
        "55",
        "34"
      ]
    }
  ],
  "DigitalSignature": "-xN_h8234PHVT3CMA9vdoHrchgZxH-xSmb1dF31y1537t3rGz3cW",
  "payload": "I8hY2thZ2VJRCI6ICJZZAwMDEwMGJ0dWVwNG5pMDAwMHYiLAoJIKZyb2lQvxJ0bmvy"
}
```

Fig. 11

```
"packageID": "vg000100btuep4ni0000000v",
"FromPartnerID": "53o73600bv3746a80000000fj",
"ToPartnerID": "53o7e60o6o7qvitp0000000uo",
"SmartContractID": "4368a4e8-c5f1-4ae8-b85f-6da672630684",
"ContractBreach": true,
"BreachedPartner": "53o73600bv3746a80000000fj",
"parameters": [
    "DateTime",
    "Temperature",
    "Humidity",
```

Fig. 14

SYSTEMS AND/OR METHODS FOR SECURING AND AUTOMATING PROCESS MANAGEMENT SYSTEMS USING DISTRIBUTED SENSORS AND DISTRIBUTED LEDGER OF DIGITAL TRANSACTIONS

CROSS-REFERENCES TO RELATED APPLICATIONS

This application is a continuation of application Ser. No. 16/136,780 filed Sep. 20, 2018, the entire content of which is hereby incorporated by reference in this application.

TECHNICAL FIELD

Certain example embodiments described herein relate to process management systems having enhanced security and automation-related functionality. More particularly, certain example embodiments described herein relate to techniques for securing and automating process management systems using distributed Internet-of-Things (IoT) sensors and distributed ledgers of digital transactions (e.g., blockchains) relating to the distributed processes being managed.

BACKGROUND AND SUMMARY

A business process is a series of enterprise tasks, often undertaken for the purpose of creating valuable output for an internal or external customer. For instance, a business process may give organizational actions structure across time, place, and functions. Business processes have become a chosen means to describe, analyze, execute, and control operational structures across departments, business units, and even business partners.

Business process management (BPM) aims at their improvement for the sake of overall operational success. Amongst others, software-enabled business process automation is an instrument to increase process efficiencies and effectiveness. Business process models have been established to specify processes throughout BPM projects. For automation purposes, for example, they document and structure process information prior to their transformation into executable (e.g., code-based) specifications. Modeling and transformation oftentimes are prerequisites for sound process automation.

Business process models help describe the logical and timely flow of business processes, effectively as a map in some instance. They may help visualize process activities as graphical symbols, possibly connecting them to a linear or other order. Logical operators may indicate when the flow splits into alternative or parallel paths, when they merge again into one, etc. This so-called control flow is a part of a business process model. The control flow may be complemented by additional model elements that differ depending on the perspective. A conceptual-organizational perspective targets the organizational process context including, for example, intra- and inter-organizational division of labor, interaction between human activities, their technical support, product outcome, etc.

The modeling language EPC (event-driven process chain) has prevailed as a de-facto standard for such conceptual business processes. It complements process activities by organizational resources responsible, input required, and output produced, supporting software application systems, organizational objectives, risks, etc. While being rather easy to use even by non-technical process analysts, it also includes important information on the logical flow, which makes it a semi-formal requirements basis for technical process implementation. It is at the transformation from conceptual into technical business process models where business process modeling changes the perspective from organizational design into technical engineering.

Model-driven process automation passes the control flow described in a conceptual business process model on to a technical business process model. Here, it typically is complemented by technical information such as, for example, process variables for storing process information during execution, online forms for user interaction, exceptions and their handling, communication patterns (asynchronous/synchronous), consistent data exchange, etc. To make a process executable, process activities typically are assigned to automated software functionality or to semi-automated user interfaces. Depending on the chosen modeling language and the targeted deployment system, this transformation may result in a second graphical diagram (e.g., in BPMN 2.0), directly into a code-based script (e.g., XPDL, BPEL, or the like), etc.

The resulting technical process models are to be deployed into the process engine of a business process management system (BPMS) or workflow management system (WFMS), which allows for starting, executing and tracking instances of this process efficiently. In general, and in furtherance of the above, business process management (BPM) refers to an approach that views a business as a set of processes or workflows. A BPM system (or BPM software tool) enables organization to model, implement, execute, monitor, and optimize its processes.

The idea of using business processes as blueprint for cross-application software systems finds analogies to the concepts of workflow management systems (WFMS) and enterprise application integration (EAI). One factor making business process automation a real technical challenge, though, is the plethora of heterogeneous and increasingly distributed software systems to be integrated and connected along a given process flow.

Most recently, service-oriented architectures (SOA) has attempted to meet this integration challenge by exposing and integrating remote software functionality through well-defined software service interfaces. Early proponents conceived of SOA instead as a specific style of distributed software architectures based on the so-called find-bind-execute relationship between service providers and consumers. More recent notions advance this integration view towards the potential SOA offers for business process automation. They put process automation into the center of the SOA discussion. The capability to compose services loosely opens new avenues to implementing business processes flexibly following dynamic business requirements. The adoption of standardized service interfaces allows for the reusing of services in different business processes, as well as flexibly replacing services according to evolving business requirements. In this sense, SOA has been considered a paradigm for organizing and utilizing distributed capabilities that may be under the control of different ownership domains.

Web services represent one of the most recent incarnations of service-oriented software technologies. Unlike previous service technologies, web services leverage and further protocol and data standards.

Scientific discourse and best practices of service-oriented architectures provide a number of service-oriented design principles. While the SOA approach reinforces well-established, general software architecture principles of interfaceorientation, interoperability, autonomy, and modularity, it also adds additional themes of process-orientation.

Thus, service-oriented design seeks to improve business process flexibility by the separation of process structure (e.g., process flow) and process institutionalization (e.g., selection of service capabilities conducting process activities). Business process systems benefit from service-orientation in several aspects. First, process structure is revisited to prepare for well-defined, comprehensive functional interfaces allowing plug-and-play services to form new business processes. Second, IT support and technical infrastructure, as well as personnel assignment, are addressed by considering process institutionalization alternatives. They affect cost-effectiveness as much as load balancing and performance figures. Third, aspects of data redundancy and data integration are of interest for service-oriented business process systems (SO-BPS), since cross-organizational service provision risks to increasing data redundancy and data control.

Business processes in today's interconnected and interdependent world have become quite complex. As shown above, modeling languages, modeling tools, and software platforms have evolved to enable these processes to be modeled and orchestrated, at least to some extent. Unfortunately, however, as more and more parties are introduced, security and trust becomes more attenuated. For instance, a typical supply chain management business process management system today has evolved into a quite centralized network, where different parties expose different software functions, perform different physical tasks, etc., towards fulfillment of a centrally-defined objective associated with the process being implemented. Although it oftentimes is possible to use existing tools to know what should happen and to determine whether something ultimately has "gone wrong" with the process, it presently is difficult to trust the parties involved in transactions to know what exactly has gone wrong, when it went wrong, and who is responsible. The introduction of more parties and more interconnections interestingly has the potential to create more division and less trust. Thus, the lack of security and lack of trust is perceivable by the process "owner," as well as among and between the different parties in the supply chain or other business process—even though those parties might not even know who the other parties are.

With the widespread distribution of sensors and the like, there is a potentially vast amount of information available with respect to many business processes. Much of this information could at least in theory be shared, as current business process management systems and software-oriented architectures contemplate exposing data sharing services, etc. However, technical issues persist, following the general pattern described above. For instance, much of the data that could be acquired directly from the parties responsible for carrying out aspects of a defined process is not actually shared with the central process owner, much less shared among and/or between those different parties.

Furthermore, technical issues exist in properly identifying and authenticating parties, both to the process owner and to one another. Without proper identification and authentication, any data that might ultimately be shared could be considered untrustworthy. In a somewhat related vein, there also technical issues concerning data provenance, which relates providing adequate and accurate records of the inputs, entities, systems, and processes that influence data of interest at different steps throughout the process (e.g., so that the data can be deemed trustworthy, not tampered with, gathered at an appropriate time and by appropriate means, etc.). Any enforcement of the policies tends to occur at the end of the process rather than mid-process, the latter of which is likely to be temporally and spatially closer to the breach of the agreed-to terms theoretically controlled by the governing BPMS and thus subject to more direct and more relevant remedial action (e.g., triggering a physical return, adjusting a temperature or humidity value, etc.).

It will be appreciated that it would be desirable to address the above-described and/or other issues. For example, it will be appreciated that it would be desirable to provide enhanced identification, authentication, data provenance, security, and process enforcement in connection with a business process management system or the like.

Moreover, although existing approaches are valid, there is a fundamental mismatch between the centralized business-level and technical definition of the process model and corresponding implementation of the BPMS and the more decentralized details as to how such processes typically are carried out. It will be appreciated that it would be desirable to address this set of paradigmatic and computerized implementation concerns, as well.

One aspect of certain example embodiments relates to addressing the above-described and/or other issues. For example, one aspect of certain example embodiments relates to providing enhanced identification, authentication, data provenance, security, and process enforcement in connection with a business process management system or the like. In certain example embodiments, blockchain technology and Internet-of-Things (IoT) sensors integrate with a BPMS to address these issues. For instance, certain example embodiments make BMPS tools (including, for example, supply chain management tools) more secure with decentralized processes using blockchain and IoT technologies. A "blockchain IoT" enabled BPMS platform advantageously enables identity, trust, and security between different parties. In certain example embodiments, IoT devices are managed by blockchain smart contracts, enabling automated process management decisions to be made and executed on (e.g., in connection with the provision of physical items) via an immutable digital ledger. In certain example embodiments, IoT and blockchain technologies can be used together in various uses cases to implement automated BPMS tasks, dynamically generate and enforce smart contracts, authorize and secure the IoT devices to send data to blockchain smart contracts, etc. Thus, certain example embodiments leverage the more centralized BPMS process definition and implementation to facilitate distributed processing in a secure and trustworthy fashion.

Another aspect of certain example embodiments relates to a dynamic smart contract component. This component in certain example embodiments is configured to automatically identify the IoT parameters from the IoT platform that are required to be monitored, and apply configurable validation rules on the IoT parameters and/or other parameters that are defined or obtained by calling an external system, etc. Such rules can be pre-programmed complex rules defined as logic sequences or the like. The IoT parameters, threshold values, global values, externally obtained data, etc., may be used to dynamically generate smart contract code for deployment to the blockchain. The need for manual coding for developing a new smart contract may be reduced and completely eliminated in some instances. New use cases with different parameters, new rules, etc., therefore can be easily plugged into the platform, providing extensibility, flexibility, survivability, etc.

Another aspect of certain example embodiments relates to an automated process management component, which allows existing BPMS components, events, and dynamically generated smart contracts to be connected to one another. An event triggering component may be used for automation.

Another aspect of certain example embodiments relates to the IoT smart contract component, which makes it easy to associate IoT devices that are authorized to send IoT sensor data with smart contracts in blockchain. This component in certain example embodiments creates the relation and authorization for IoT devices and smart contracts, so not all IoT devices can send to all smart contracts. This component also generates private keys for the IoT device groups that may be used for encryption in certain example embodiments.

In certain example embodiments, an electronic resource tracking and storage computer system that is configured to communicate with a plurality of computing systems operated by different respective participants is provided. Each said computing system stores a copy of a blockchain of a distributed blockchain computing system and has associated therewith a computing device including at least one sensor. The electronic resource tracking and storage computer system comprises a computer storage system configured to store: a plurality of blockchain participant identifiers, with each said blockchain participant identifier being associated with a corresponding one of the plural different participants; and a set of programmed rules including one or more conditions to be met by the participants in cooperating to complete, in connection with a resource that is tracked via the blockchain, a modeled process comprising a plurality of modeled tasks. A transceiver is configured to receive, from the computing devices, electronic data messages including values from the respective sensor(s) connected thereto, as well as identifiers of the transmitting computing devices and/or associated participants. A processing system, which includes at least one hardware processor and is coupled to the computer storage system and the transceiver, is configured to: receive, via the transceiver, electronic data messages signed by their respective transmitting computing devices and/or associated participants; based on the received electronic data messages, generate blockchain transactions including value(s) in the respective electronic data messages and the identifiers of the respective transmitting computing devices and/or associated participants; publish the generated blockchain transactions to the computing systems for inclusion in the copies of the blockchain stored thereon; validate the value(s) in the respective electronic data messages against the set of programmed rules; and based on results of the respective validations, emit events to an event bus monitored by a modeled process management system, the emitted events including information related to results of the respective validations and being structured to selectively trigger the modeled process management system to automatically implement at least one of the modeled tasks in dependence on the results of the respective validations.

According to certain example embodiments, the sensors may be configured to measure physical properties associated with the resource that is tracked.

According to certain example embodiments, the computing devices may be configured to transmit electronic data messages at first timed intervals, and/or while a network connection to the transceiver is available; and/or the processing system may be configured to perform validation and/or generate blockchain transactions at second timed intervals and/or upon receipt of electronic data messages.

According to certain example embodiments, the computer storage system may be configured to store multiple different sets of programmed rules applicable to different modeled processes that respectively include different modeled tasks.

According to certain example embodiments, the programmed rules may be sequences of program logic incorporating the conditions to be met in programmatic form, which may in some instances include additional program logic unrelated to sensor data.

According to certain example embodiments, electronic data messages may be encrypted with private keys of their respective transmitting computing devices and/or associated participants, and the processing system may be further configured to decrypt received electronic data messages using a public key.

According to certain example embodiments, electronic data messages may include "from" and "to" device and/or participant identifiers; both structured data, and a payload separate from the structured data which is a hash value thereof; status of the resource; and/or the like.

According to certain example embodiments, the modeled process management system may be configured to subscribe to events published to the event bus as queues and/or topics.

According to certain example embodiments, events may have associated event types, e.g., with the event types being mapped to triggers associated with different modeled tasks in the modeled process.

In certain example embodiments, a distributed blockchain computing system is provided. A computer storage system is configured to store a blockchain. A transceiver is configured to facilitate electronically-mediated communication, over a network, with a plurality of external computing systems operated by different respective participants. Each said external computing system stores a copy of the blockchain of the distributed blockchain computing system and has associated therewith a computing device including at least one sensor. The participants cooperate in performing a process that is modeled, in an external process modeling system, in connection with a plurality of modeled events. A processing system including at least one hardware processor is coupled to the computer storage system and the transceiver, and is configured to: establish a device group identifying the respective computing devices involved in completing the modeled process; identify parameters provided by the sensors of the computing devices identified in the device group that are related to completing the modeled process; dynamically generate, for deployment to the distributed blockchain computing system, one or more sets of executable code corresponding to validation rules for the identified parameters; and map each said dynamically generated set of executable code with one or more of the modeled events, such that evaluation of the validation rules by the distributed blockchain computing system is configured to selectively trigger, in the external process modeling system, the one or more modeled events mapped to the corresponding set of executable code.

According to certain example embodiments, the processing system may be further configured to: establish a plurality of different device groups; associate each of the different device groups with one or more of the different modeled events; and for each said device group, identify parameters provided by the sensors of the computing devices identified in the respective device group that are related to the associated modeled events.

According to certain example embodiments, each said set of executable code may be associated with at least one of the plural different device groups. In this regard, according to certain example embodiments, each said set of executable code may be executable only in response to the distributed blockchain computing system receiving, via the transceiver, an electronic message from one of the computing devices in the device group associated therewith.

According to certain example embodiments, the processing system may be further configured to authorize which computing devices are operable to trigger execution of the one or more sets of executable code.

According to certain example embodiments, the external process modeling system may be configured to store data for a plurality of different modeled processes that are performable in connection with different respective modeled events, and different sets of executable code may be applicable to each of the different modeled processes.

According to certain example embodiments, the transceiver may be further configured to receive electronic data messages from the computing devices, with the electronic data messages including values for the sensor(s) of the respective computing devices and being signed by the respective computing devices, and the evaluation of the validation rules may be performed based on information included in the electronic data messages.

According to certain example embodiments, the electronic data messages may each include, as their respective signatures, an encrypted hash of at least the sensor value(s) therein, e.g., with the hashes being encrypted with private keys assigned to the respective transmitting computing devices.

According to certain example embodiments, the processing system may be further configured to publish to an event bus, monitored by the external process modeling system, event messages resulting from the evaluation of the validation rules by the distributed blockchain computing system in order to cause the external process modeling system to selectively and automatically trigger the one or more modeled events mapped to the corresponding set of executable code.

According to certain example embodiments, the processing system may be further configured to: generate, based on the received electronic data messages, new blocks for the blockchain, with the new blocks comprising transaction and state change information related to the process, which includes current and previous signature values; and broadcast the new blocks to the computing systems for local validation and verification and, conditioned on the local validation and verification, updating of the copies of the blockchains thereon.

In addition to the features of the previous paragraphs, counterpart methods, non-transitory computer readable storage media tangibly storing instructions for performing such methods, executable computer programs, and the like, are contemplated herein, as well. Similarly, servers, client computing devices, and the like, usable in connection with the systems laid out in the previous paragraphs, also are contemplated herein.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 11 shows an example of a new protocol that may be used for communication between IoT devices, a blockchain network, and a BPMS, in accordance with certain example embodiments;

FIG. 14 is an example of event data in accordance with the example use case discussed herein;

DETAILED DESCRIPTION

Figure 1:
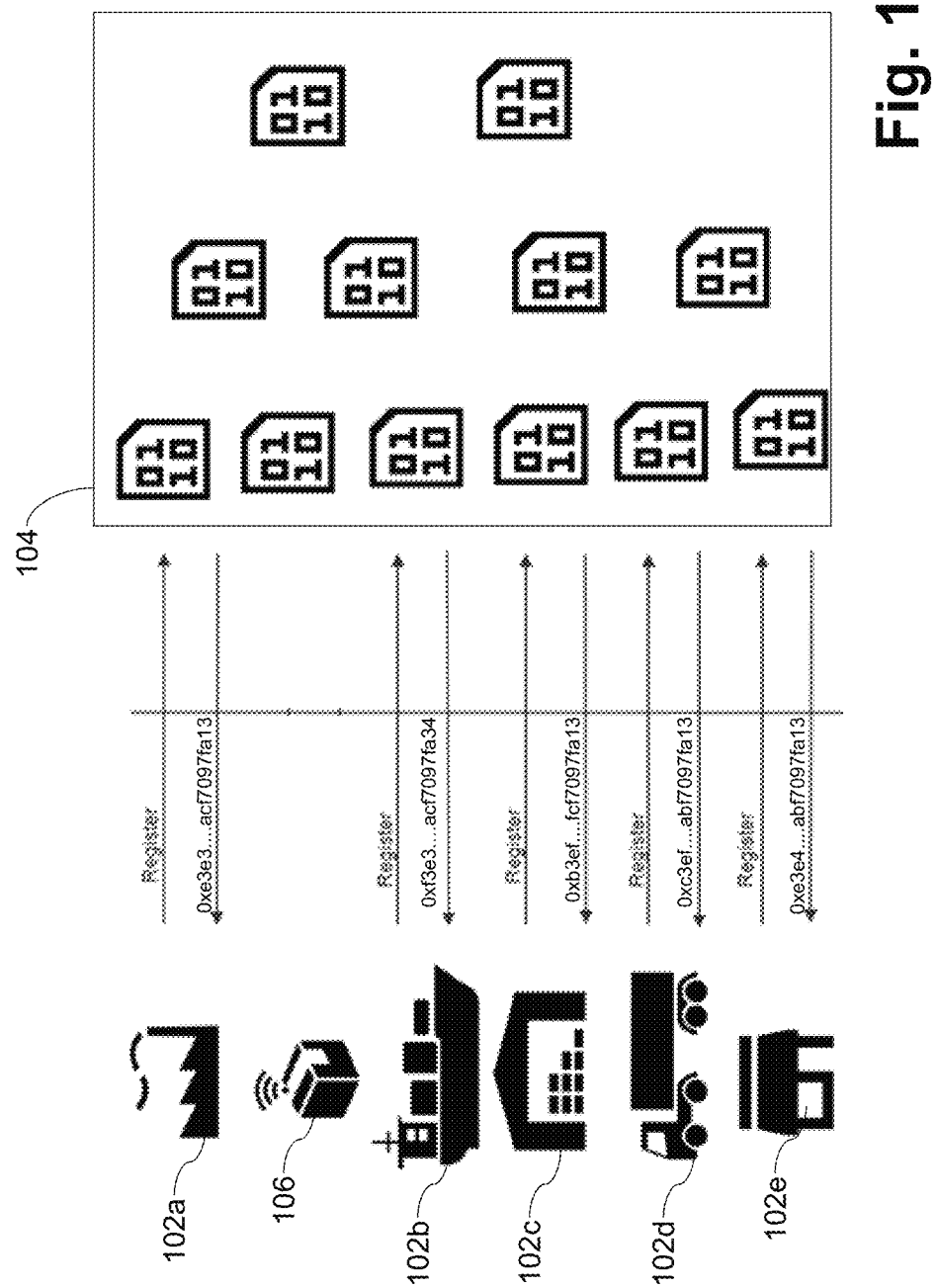
FIG. 1 is a diagram showing physical parties in a supply chain associated with an example use case being registered to the blockchain network and being assigned a digital identity, in accordance with certain example embodiments.

Certain example embodiments described herein relate to techniques for securing and automating process management systems using distributed Internet-of-Things (IoT) sensors and distributed ledgers of digital transactions (e.g., blockchains) relating to the distributed processes being managed. The Internet-of-Things (IoT) may be thought of as being a network of physical devices and items embedded with, or otherwise being connected to, electronics, software, sensors, actuators, and connectivity, which enables these objects to connect to each other and/or external systems and exchange data. A blockchain is a continuously growing list of records, called blocks, that are linked and secured cryptographically. Each block typically includes a cryptographic hash of the previous block, a timestamp, and transaction data. Thus, certain example embodiments use IoT sensor information and send it to blockchain smart contracts to make and/or enforce automated business process-related decisions. Advantageously, certain example embodiments help provide for monitoring and governance of processes via tracking and/or tracing with IoT and/or other enabled devices. Such devices may monitor and report on key performance indicators (KPIs) and/or other metrics related to the current status of the process, with the source of the data being authenticated and the content of the data being deemed trustworthy. Example use cases include, for instance, any kind of organization involving transportation of sensitive goods such as, for example, fruits, medicine, etc., as such example processes can oftentimes require certain measurable parameters (e.g., temperature, pressure, humidity, etc.) to be kept within specified and verifiable limits. In such use cases, packages containing the sensitive goods will be transported with IoT and/or other sensors connected thereto to report on process-relevant information such as, for example, temperature, pressure, humidity, etc.

A digital smart contract is created for the parties associated with the process including, for example, a factory, shipping and logistics companies, etc., to transport goods within the agreed limits. The sensor readings are sent to the blockchain cloud to be stored in an immutable digital ledger, e.g., in real time as the package is transported from A to B to C. The sensor readings are validated with the smart contract and committed to the blockchain. If at any time the monitored parameters do not match the agreed-to values specified in the created smart contract, the smart contract triggers a breach event. The breach event may in turn cause a return order BPMS process request or the like to be automatically started, along with other appropriate actions (e.g., notification to the other parties to the smart contract, penalty payment BPMS processing, etc.). The transactions are stored in immutable blockchain ledger, so parties trying to update the reported values will fail, thus creating security and trust among and between the parties.

Example Implementation and Example Use Case

Details concerning an example implementation and an example use case are provided below. It will be appreciated that this example implementation is provided to help demonstrate concepts of certain example embodiments, and aspects thereof are non-limiting in nature unless specifically claimed. For example, descriptions concerning example component configurations, event types, event data packets, smart contract code, etc., are non-limiting in nature unless specifically claimed. Similarly, it will be appreciated that this example use case is provided to help demonstrate concepts of certain example embodiments, and aspects thereof are non-limiting in nature unless specifically claimed. For example, descriptions concerning example parties, goods, sensor readings, parameters, actions, etc., are non-limiting in nature unless specifically claimed. In brief, the example embodiments described herein may be applied in connection with different architectures and/or different use cases.

The example use case presented below relates to the supply chain associated with vaccinations. This use case reflects the reality that not all vaccines are transported under optimal conditions (including, for example, optimal temperature conditions), which sometimes causes vaccine ineffectiveness, adverse reactions, etc. The example use case uses techniques of certain example embodiments to validate whether the vaccines are transported under optimal conditions in an authenticated and secure manner and is able to trigger actions when smart contract terms are breached.

This example use case involves four main elements, namely, blockchain registration of different parties, smart contract signing and deployment to the blockchain, business process management system (BPMS) process flow coordination in connection with IoT-enabled package transportation, and miners validating and committing the transactions to the blockchain. These four aspects are elaborated upon, in turn, below.

Blockchain Registration

IoT and blockchain technologies are used to address the authentication, data provenance, trust, security, and/or other technical issues underlying the supply chain management issues associated with the example use case. FIG. 1 is a diagram showing actual, physical parties in a supply chain associated with an example use case being registered to the blockchain network and being assigned a digital identity, in accordance with certain example embodiments. More particularly, in this example use case, the parties include a manufacturing factory 102a, a shipping company 102b, a warehouse storage company 102c, a logistics company 102d, and pharmacies or other shops 102e.

Different parties send registration requests to the blockchain network 104. The blockchain network 104 responds with a unique identifier that serves as a digital identity or private key. The IoT package 106 is registered in the IoT platform to send data to the blockchain, as will become clearer from the description below.

Figure 2:
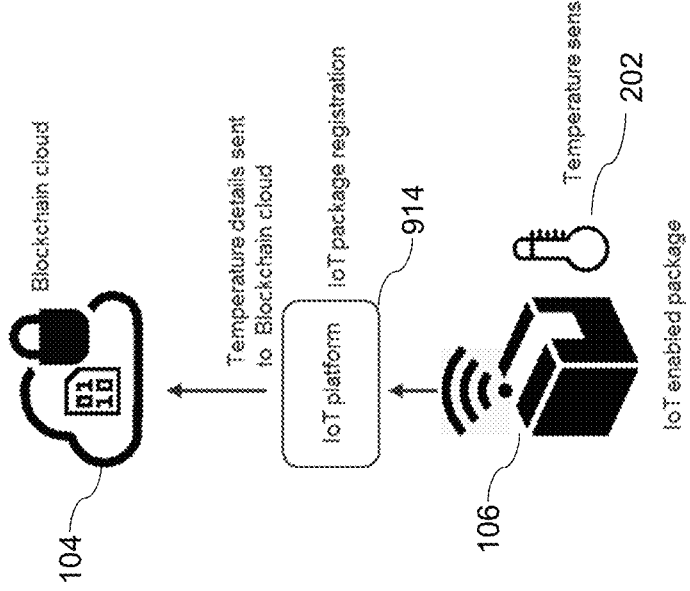
FIG. 2 is an example of an IoT enabled package 106 communicating with the blockchain cloud 104, in accordance with certain example embodiments.

FIG. 2 is an example of an IoT enabled package 106 communicating with the blockchain cloud 104, in accordance with certain example embodiments. The vaccine is packed inside the IoT enabled package 106 for transport. In this case, temperature and/or other sensors 202 attached to the package 106 monitor its actual temperature. The IoT package 106 sends the sensor information to the blockchain 104 hosted in the cloud via any suitable network connection (e.g., Wi-Fi, 3G/4G/LTE or other mobile communication standard, satellite communication, etc.).

Smart Contract Signing and Deployment to the Blockchain

Figure 3:
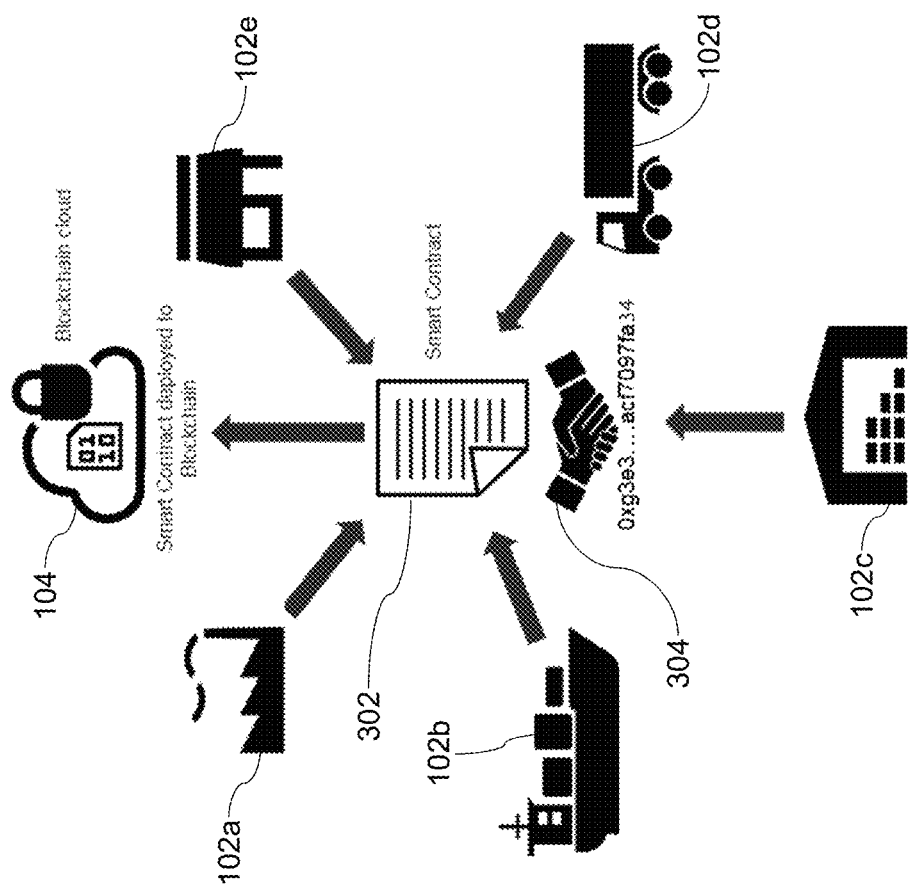
FIG. 3 is an example smart contract that may be used in connection with certain example embodiments.

A smart contract refers to a computer protocol intended to digitally facilitate, verify, and/or enforce the negotiation or performance of a contract. Smart contracts allow the performance of credible transactions without third parties. These transactions typically are trackable and irreversible. FIG. 3 shows an example smart contract that may be used in connection with certain example embodiments. In this example use case, the smart contract 302 includes software code signed 304 by all of the parties 102a-102e shown in FIG. 1, and will involve all parties maintaining an optimal temperature for the transportation of packages. The smart contract 302 is deployed into the blockchain network 104. A party that breaches the smart contract 302 has to pay a penalty in this example.

In accordance with the smart contract 302, packages are transported with IoT-enabled edge devices, which include temperature sensors, as described in connection with FIG. 2. Each IoT-enabled edge device at least temporarily stores temperature readings and sends values to the blockchain cloud 104 (e.g., at predetermined intervals or times, whenever the network is available, etc.).

The smart contract comprises computer-executable code and may be implemented in connection with any suitable programming language. One example programming language that may be used in connection with certain example embodiments is Solidity, which is a contract-oriented programming language for writing smart contracts. Code Appendix A sets forth code for the above-described smart contract in Solidity. As will be appreciated from Code Appendix A, the supply chain related contract involves parties or entities sending event-related data. The event related data provides notifications with the entity's address, date/time, temperature reading, location from which and to which the associated package is being shipped, and a status value. Parties or entities can be added to the contract, and inspection can be triggered if the temperature exceeds a set value.

BPMS Process Flow Coordination

Figure 4:
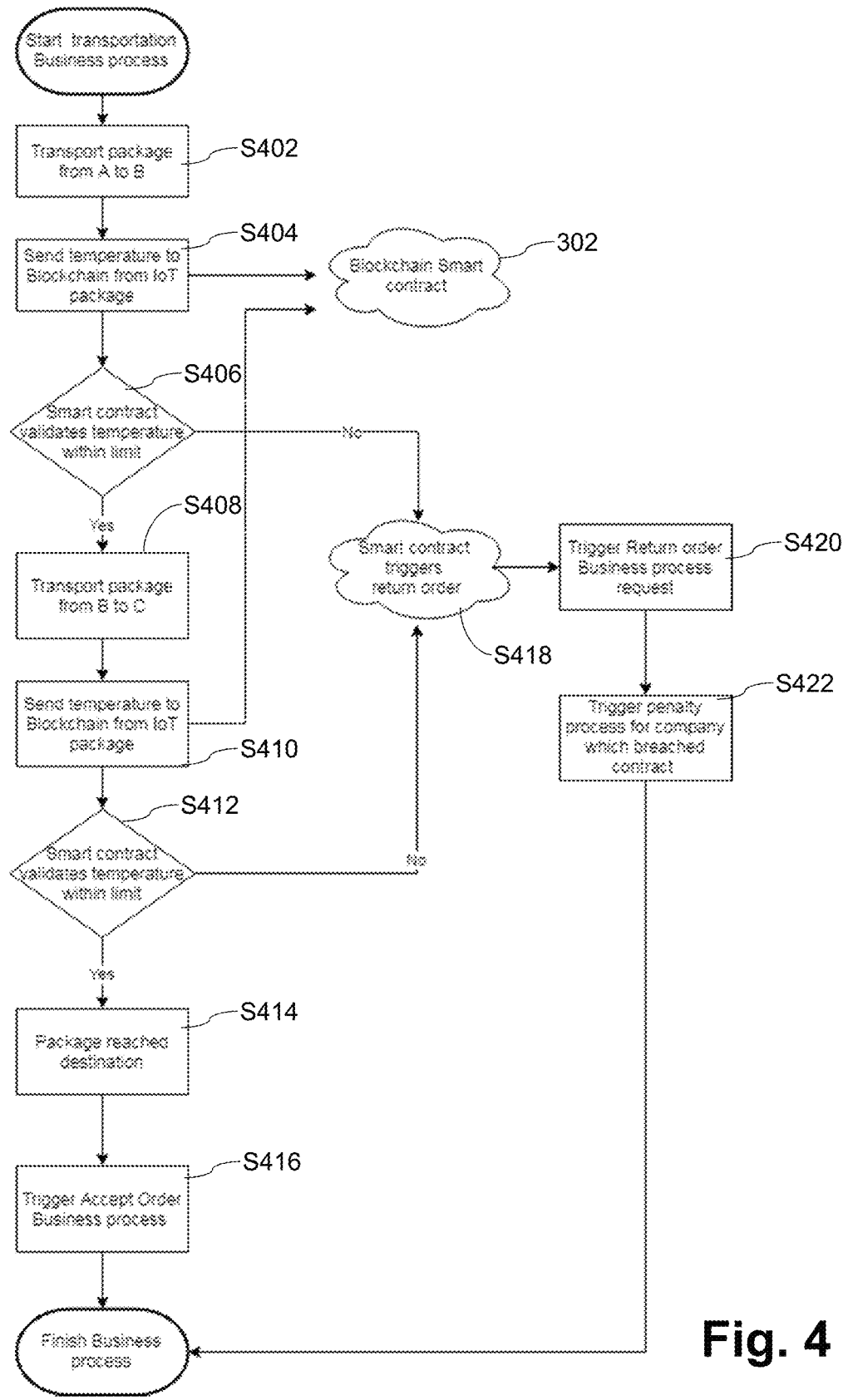
FIG. 4 is a flowchart showing the BPMS implementing the business process associated with the smart contract in this use case, in accordance with certain example embodiments.

FIG. 4 is a flowchart showing the BPMS implementing the business process associated with the smart contract in this use case, in accordance with certain example embodiments. The FIG. 4 process begins in step S402 when the transportation of the package is started, and all parties digitally sign the smart contract. In general, if the package is above the temperature limits, a return order process is initiated, and a penalty process starts for the party that has breached the contract. To make this happen, temperature readouts from the IoT-enabled package are provided to the blockchain 104 in step S404, and the blockchain smart contract 302 may be consulted. That is, in step S406, the smart contract validates that the temperature values are within the limits specified in the contract 302. If the smart contract 302 indicates that the process can continue, then the package is transported to the next destination in step S408, temperature values are gathered in step S410, and the smart contract 302 is again consulted in step S412. This loop may continue as the package moves from position to position, e.g., until it reaches its destination in step S414, or until a problem has been found. Assuming that the package reaches its destination successfully, the smart contract 302 triggers the accept order process in step S416, and the process is concluded.

On the other hand, if there is a problem detected by the smart contract 302 (e.g., at step S406, step S412, etc.), then the smart contract 302 triggers the return order process in step S418, which causes the return order to be processed in step S420 and a penalty process for the breaching party in step S422.

Figure 5:
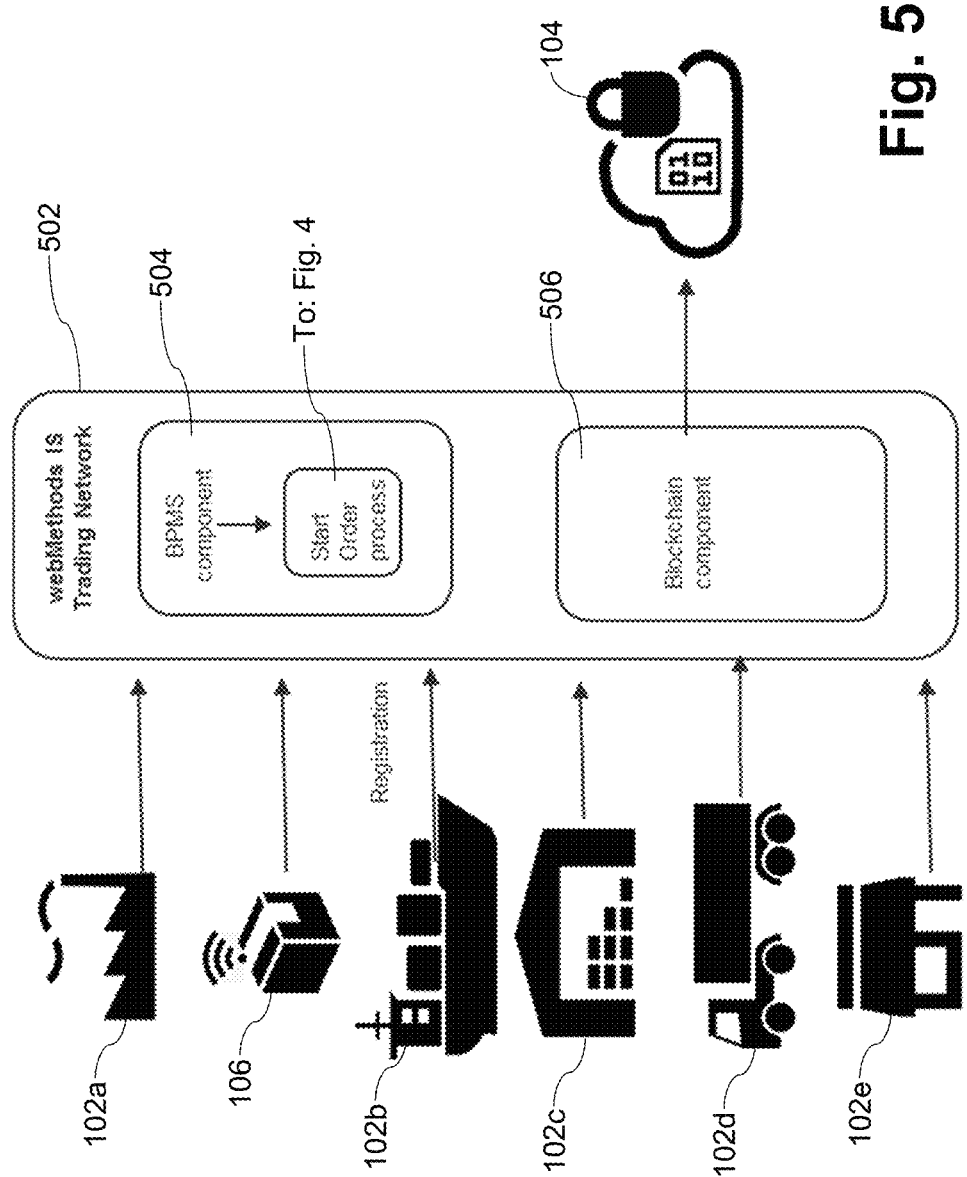
FIGS. 5-8 schematically demonstrate how the process depicted in FIG. 4 can be implemented in connection with elements of an integration server that provides BPMS, blockchain, and smart contract functionality, in accordance with certain example embodiments.

FIGS. 5-8 schematically demonstrate how the process depicted in FIG. 4 can be implemented in connection with elements of an integration server that provides BPMS, blockchain, and smart contract functionality, in accordance with certain example embodiments. FIG. 5 shows the parties 102a-102e registering with the blockchain 104 and the integration server 502, and shows the package 106 registering via the IoT platform for participation in the BPMS process of FIG. 4. The integration server 502 may be based on the webMethods Integration Server Trading Network platform (commercially available from the assignee) but, as noted above, may also incorporate blockchain and smart contract functionality in addition to BPMS functionality. The BPMS component 504 handles the registration for participation in the business process and initiates the FIG. 4 start order process. The blockchain component 506 handles the registration for the blockchain network 104. When the shop 102e places an order, manufacturing is triggered by virtue of the BPMS initiating the FIG. 4 process.

Figure 6:
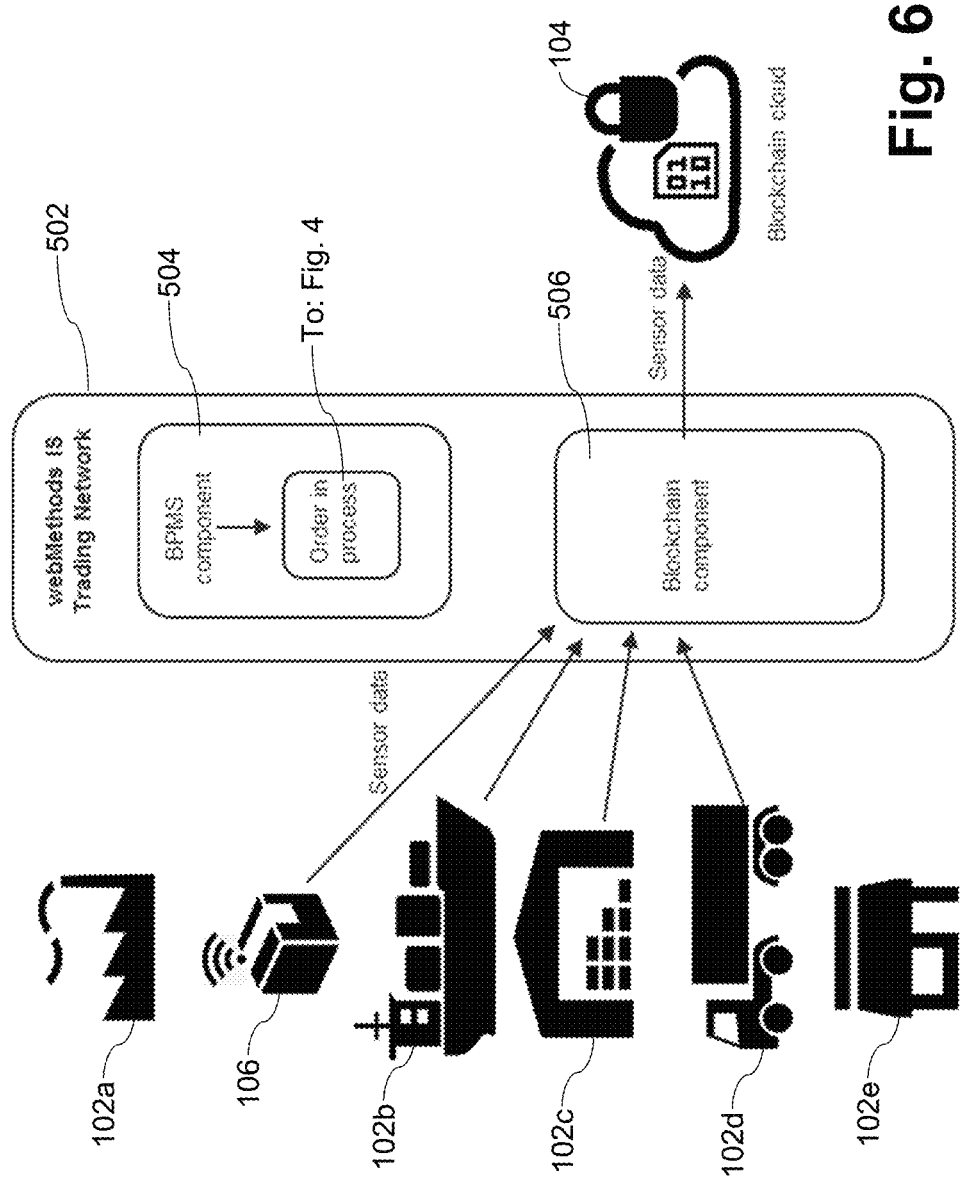

As shown in FIG. 6, as the goods are transported from the manufacturer with IoT-enabled package, the IoT-enabled package sends sensor data to the blockchain cloud 104 via the blockchain component 506 of the integration server 502. The product is tracked through the various touch points, and the blockchain cloud 104 is updated accordingly. As time passes, the smart contract associated with the blockchain cloud 104 uses the reported sensor data to monitor whether the temperature is kept within threshold.

Figure 7:
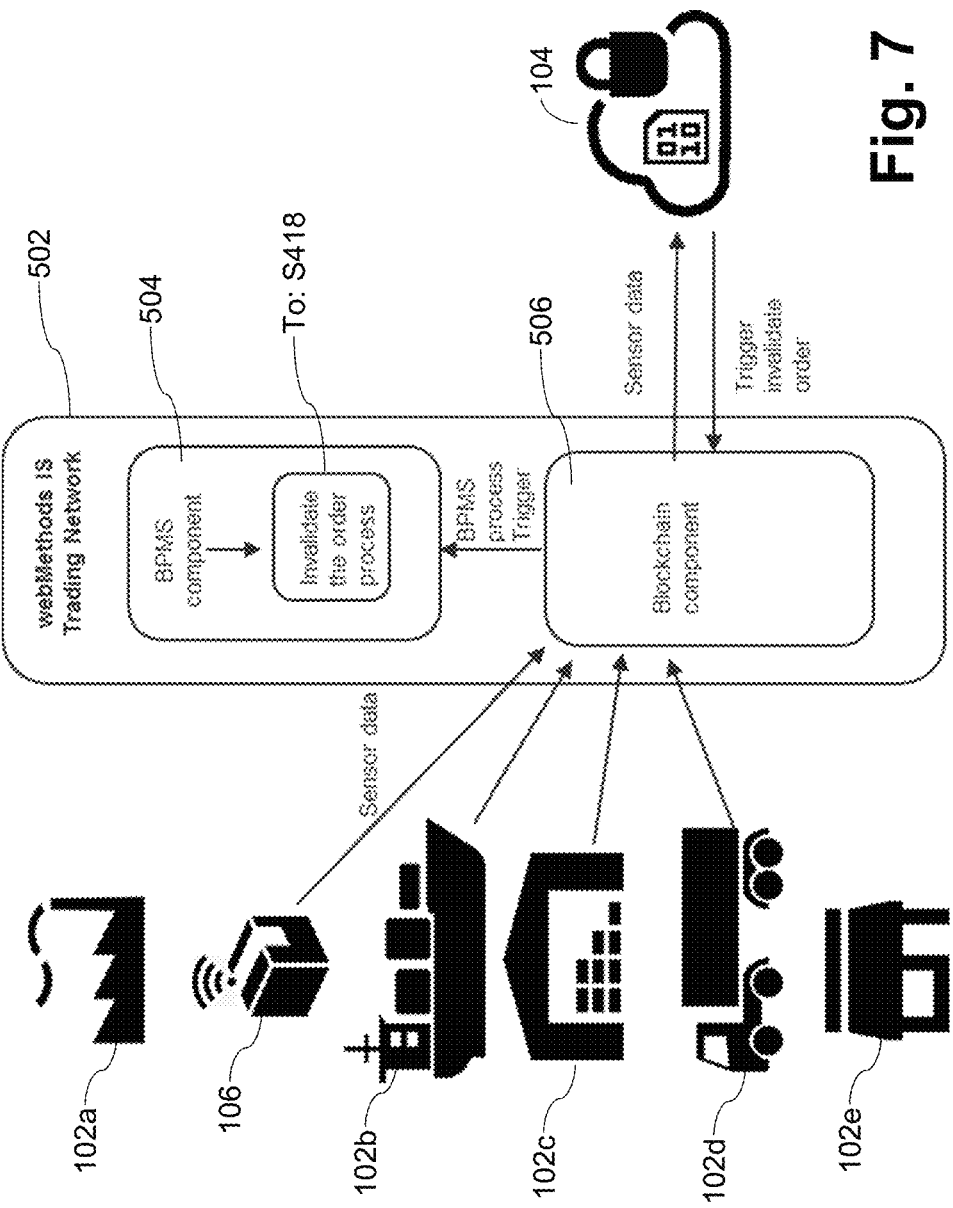

FIG. 7 shows the IoT package 106 sending temperature values that are outside of the specified threshold. The blockchain smart contract validates that the temperature readings are accurate, confirms that they are outside of the contract's limits, and triggers the invalidate order process. This is possible by having the blockchain component 506 communicate with the BPMS component 504, and relying on the BPMS component 504 to in turn trigger the invalidate order process associated with, among other things, step S418.

Figure 8:
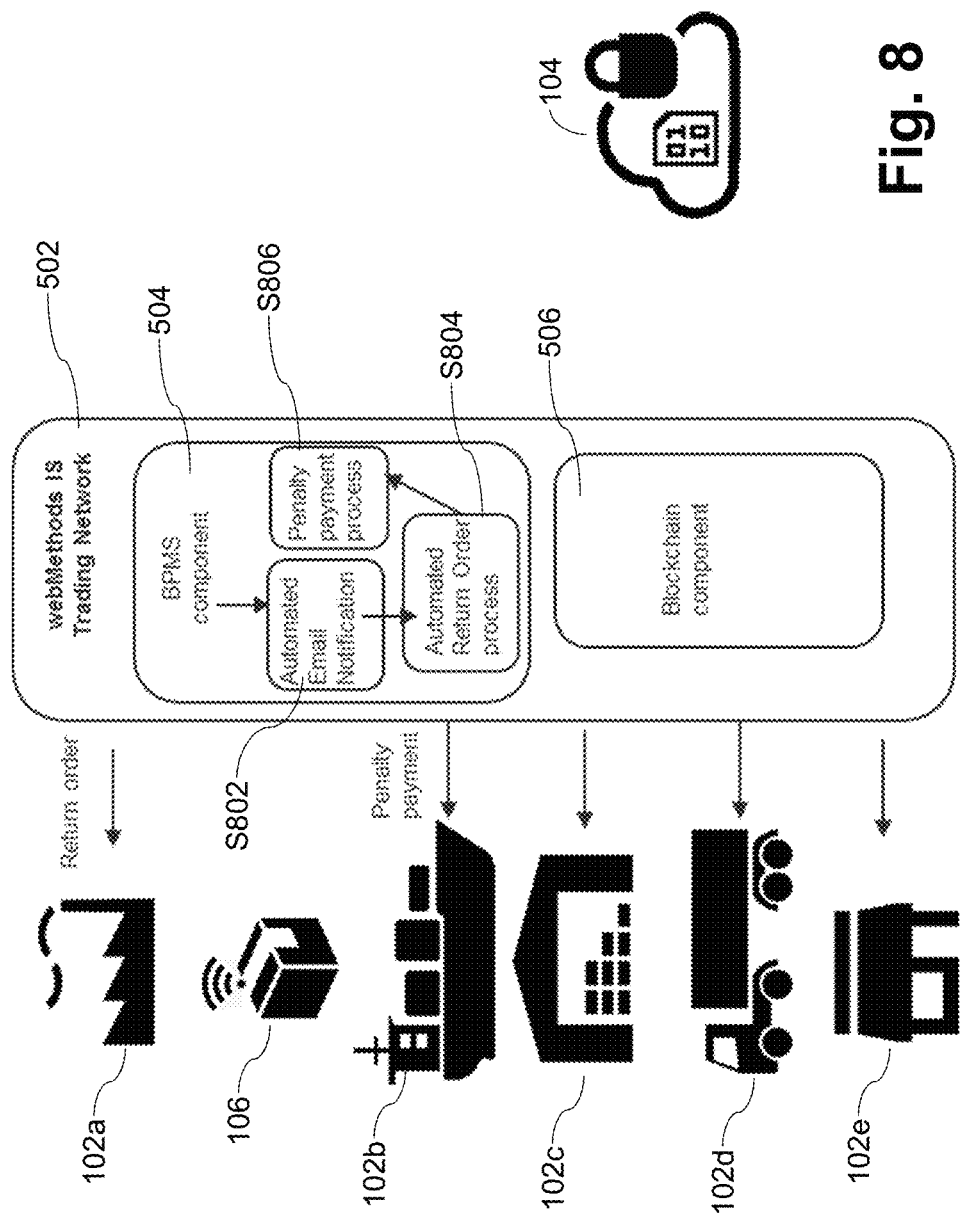

In FIG. 8, the BPMS component 504 automatically starts the invalidate order process, sending an automated email notification in step S802 to interested parties (e.g., the original store 102e that placed the order; the factory 102a to let it know to anticipate the return; downstream parties including the warehousing 102c and delivery 102d parties to let them know to not expect the package 106; and the shipping party 102e to let it know that it is in breach). The BPMS component initiates the automated return order process in step S804 and also enacts the penalty payment process in step S806 for the party that breached the smart contract. This approach advantageously is highly automated, providing end-to-end supply chain management with blockchain, IoT, and BPMS functionality, potentially with little or no manual intervention required when tracking the progress of the process, detecting the breach, and handling the outcome of the breach.

Mining to Validate and Commit Transactions to the Blockchain

In general, mining refers to the adding of transaction records to the blockchain ledger of past transactions. Miners are blockchain nodes that commit the transactions in blockchain network. Each party of a business process executed by a BPMS can be part of the consensus and, as a result, each party should have a copy each transaction. In this example use case, each of parties 102a-102e will have transactions listing temperature, transit, and other related details. If a party tries to update an existing transaction, the attempted modification would be identified by other mining nodes. The doctored transaction in some instances would be overwritten with the original value, thus maintaining the immutable digital ledger of the transportation events during the journey of the package 106. This approach creates the trust between the parties that agreed to the smart contract.

Example End-To-End Architecture

Figure 9:
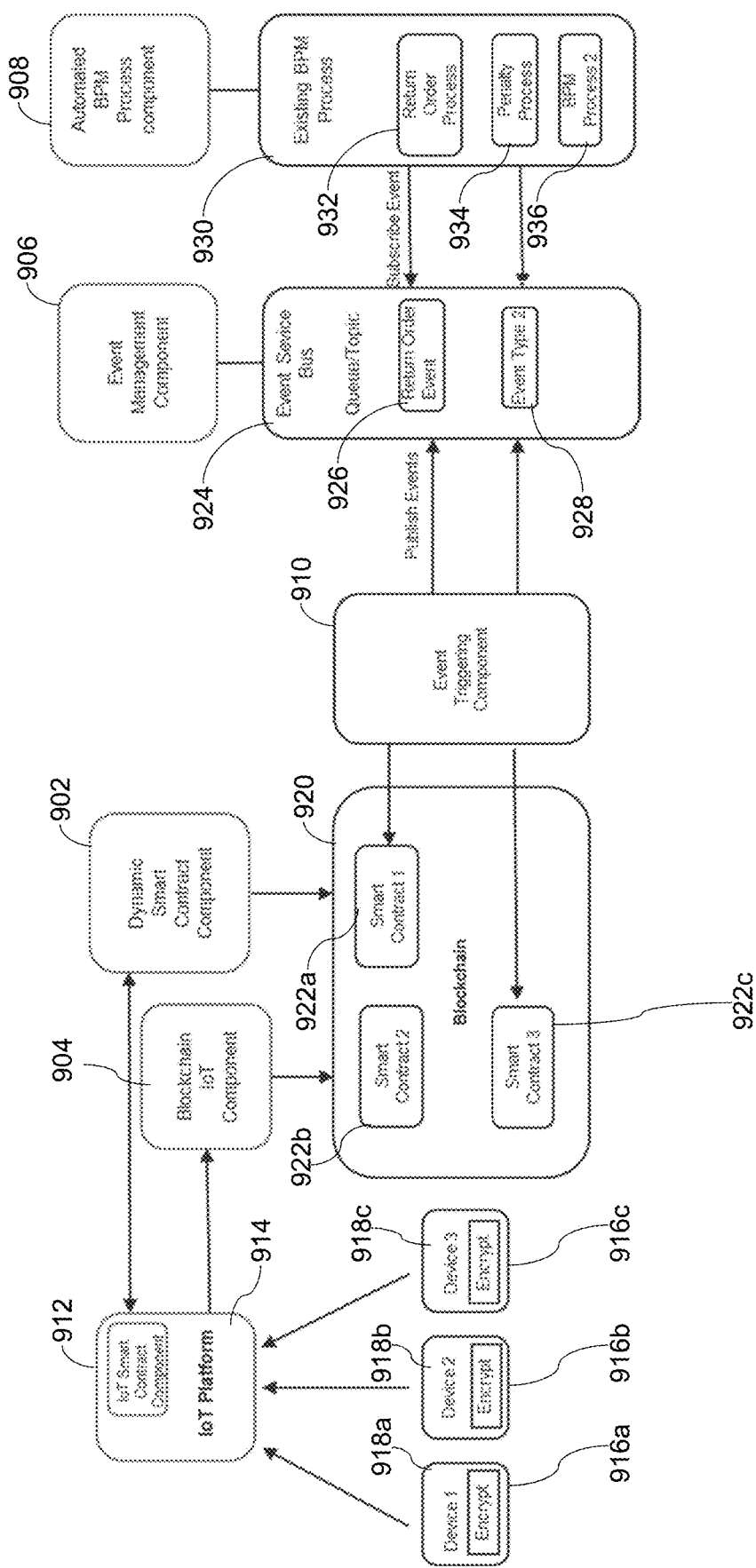
FIG. 9 is a block diagram showing an end-to-end architecture for securing and automating BPMS with IoT and blockchain technologies, in accordance with certain example embodiments.

FIG. 9 is a block diagram showing an end-to-end architecture for securing and automating BPMS with IoT and blockchain technologies, in accordance with certain example embodiments. FIGS. 10-20 provide further details concerning the components shown in FIG. 9. In brief, it can be seen that the dynamic smart contract component 902, blockchain IoT component 904, event management component 906, automated BPM process component 908, event triggering component 910, IoT smart contract component 912 within the IoT platform 914, and encrypt/decrypt components 916a-916c provided to the IoT devices 918a-918c respectively, cooperate in providing this end-to-end architecture. The various components shown in these diagram may be executed in connection with the same or different processing resources provided to different computing systems, e.g., with the processing systems including at least one hardware processor and a memory operably connected thereto. Applications presenting user interfaces (e.g., graphical user interfaces or the like) may be provided, e.g., for design time configuration operations, monitoring, etc. In certain example embodiments, the parties will operate their own respective computing systems and have their own devices that interact with a resource to be managed, e.g., to obtain and transmit data from IoT-enabled edge devices, etc. These IoT-enabled edge devices may be lightweight devices with their own processing resources in certain example embodiments.

Figure 10:
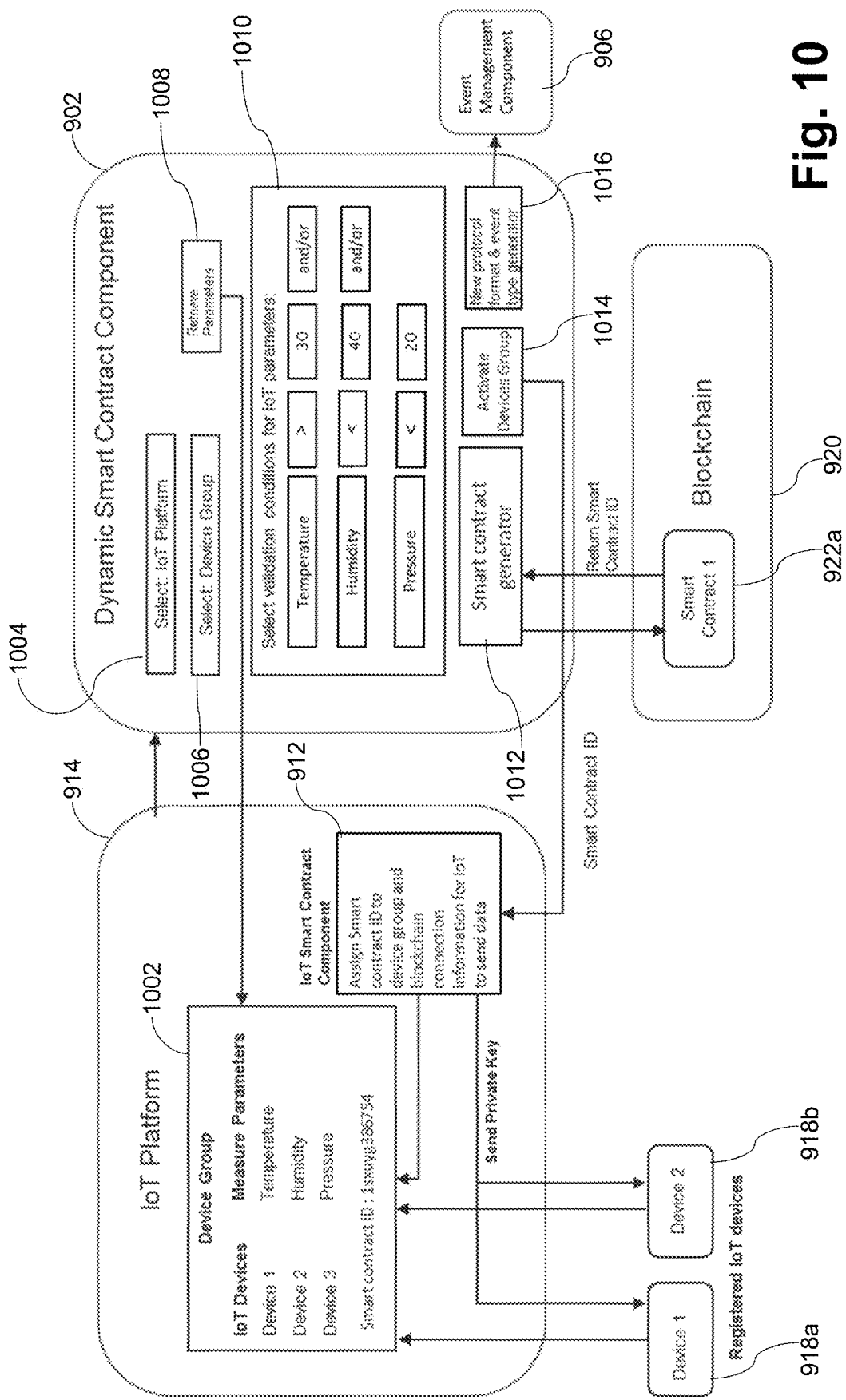
FIG. 10 provides further details concerning the example dynamic smart contract component shown in FIG. 9, in accordance with certain example embodiments.

FIG. 10 provides further details concerning the example dynamic smart contract component 902 shown in FIG. 9, in accordance with certain example embodiments. FIG. 10 helps demonstrate how a designer can create dynamic smart contracts based on the IoT parameters to be monitored. The IoT devices 918a-918c with sensors are registered with the IoT platform 914. The IoT platform may be based on, for example, Cumulocity, which is commercially available from the assignee. The IoT devices 918a-918c registered with the IoT platform 914 are able to measure parameters such as, for example, temperature, humidity, pressure, etc. These devices 918a-918c are grouped under a device group 1002, e.g., for sending data to the blockchain 920.

Via a user interface provided to the dynamic smart contract component 902, a user is able to select or otherwise specify relevant to smart contract creation. For example, the user may specify an IoT platform 1004 and corresponding device group 1006 relevant to the smart contract being created. A user-selectable option for retrieving parameters 1008, when selected, automatically adds IoT parameters relevant to the specified device group 1006 (in this case, temperature, humidity, pressure, etc.), into the dynamic smart contract component 902 user interface. The user also can select or specify custom parameters, e.g., to be retrieved via external application programming interface (API) and/or web service calls, that pertain to global constants or the like, etc. External APIs can be configured in this component 902 to retrieve data, as well.

The user is able to specify validation conditions 1010 for the retrieved IoT parameters. The validation conditions 1010 may be specified using simple and/or complex rules. In certain example embodiments, the rules may be specified in terms of Boolean expressions, conditional statements, and/or the like. In addition, or in the alternative, a more programmatic approach to providing complex rules may be provided, e.g., by permitting the user to provide code snippets in any suitable programming language. Based on the parameters, threshold values, rules, etc., code for the smart contract will be created dynamically by the smart contract generator 1012. Generated smart contracts 922a-922c are deployable to the blockchain network 920.

The blockchain 920 returns the smart contract identifier to the dynamic smart contract component 902. When the user activates device group by selecting the associated option 1014, the IoT smart contract component 912 in the IoT platform 914 is activated by associating the device group identifier with the smart contract identifier. The IoT smart contract component 912 assigns the smart contract identifier to the applicable device group(s) 1002 and make available blockchain connection information so that the implicated IoT devices 918a-918c are able to send data to the blockchain 920. Thus, the devices 918a-918c in the device group 1002 have the smart contract identifier, which will be associated with the IoT data coming from those devices 918a-918c. A private key for encryption also will be sent to the registered devices 918a-918c so that they can encrypt the data that will be sent to the blockchain 920.

The new protocol generator will create the new protocol format that will be used for communication between IoT devices 918a-918c, the blockchain 920, the BPM system, etc. This new protocol format is changeable, e.g., based on the IoT parameters selected in the dynamic smart contract component 902. Furthermore, this protocol will be used by the event management component 906, as explained in greater detail below.

FIG. 11 shows an example of a new protocol that may be used for communication between IoT devices, a blockchain network, and a BPMS, in accordance with certain example embodiments. As will appreciated from FIG. 11, the protocol standardizes ways in which at least the following information can be communicated:

PackageID—the identifier of the goods or package that is being/to be transported.

FromPartnerID—the identifier of the trading partner from whom the package is sent.

ToPartnerID—the identifier of trading partner who has received the package.

SmartContractID—the identifier of the smart contract to which the partners agree.

Parameters, ParameterValue—includes the parameters that the IoT devices send.

DigitalSignaure—encryption of the payload of IoT data sent.

Payload—a hash code of the IoT data sent.

ContractBreach—set to true or false by the BPMS event trigger component 910.

BreachedPartner—the partnerID that breached the contract.

The IoT data sent in the new protocol standard is more secure, as it has a digital signature. This enables the original message to be verified in the blockchain IoT component 904, for example, e.g., to determine whether there has been any tampering with the data during transit from the IoT device to the cloud or otherwise.

Figure 12:
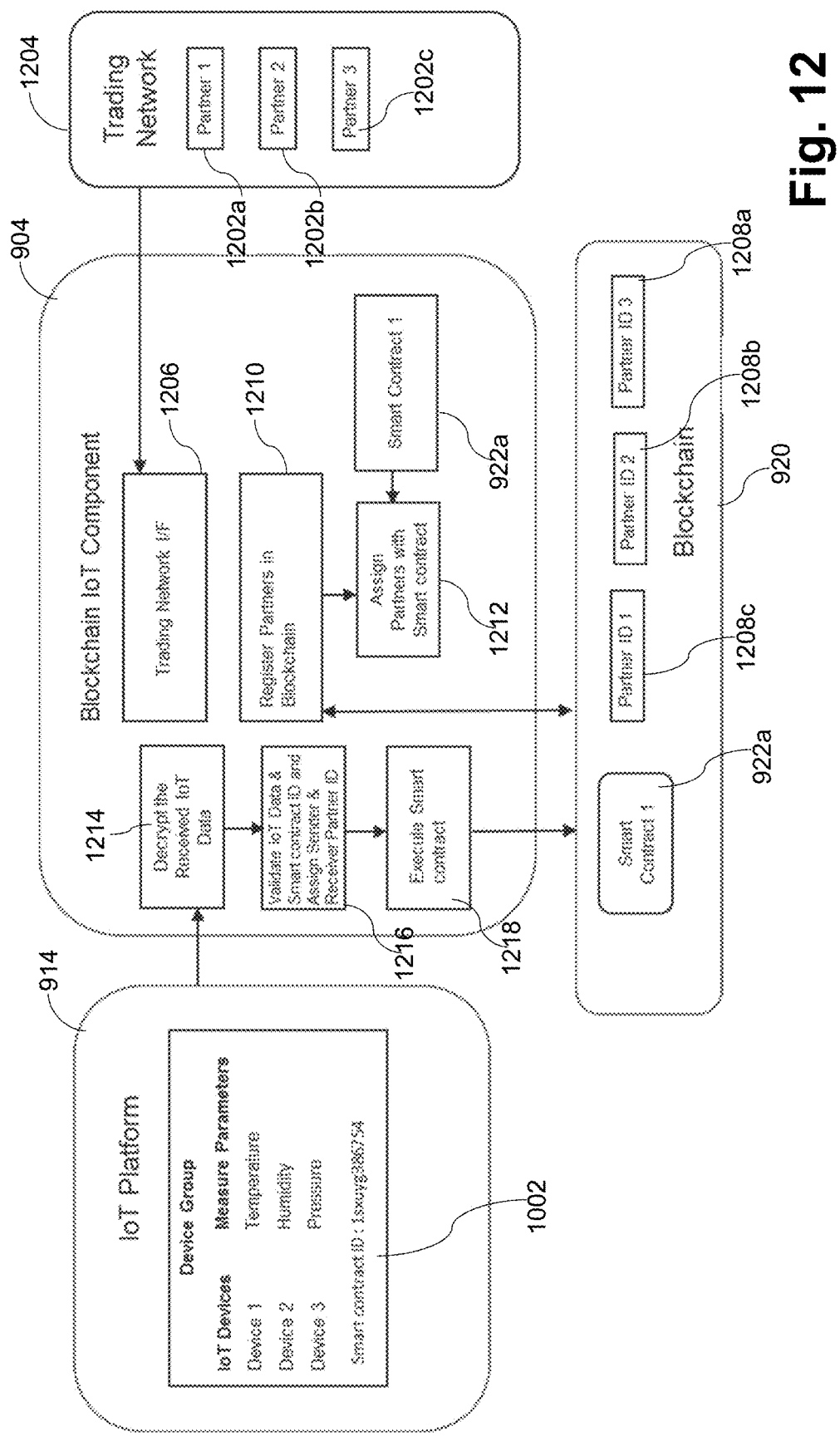
FIG. 12 provides further details concerning the blockchain IoT component shown in FIG. 9, in accordance with certain example embodiments.

FIG. 12 provides further details concerning the blockchain IoT component 904 shown in FIG. 9, in accordance with certain example embodiments. In certain example embodiments, the blockchain IoT component 904 is both a runtime and design time component. This component 904 retrieve a listing of partners 1202a-1202c registered with the trading network 1204 via the trading network interface 1206. Those partners are registered in the blockchain 920 when initiated by a user-selectable option 1210. The blockchain 920 returns to the blockchain IoT component 904 unique partner identifiers 1208a-1208c created therein that correspond to the partners 1202a-1202c. The user can assign the partners 1202a-1202c to the smart contract 922a that was created by the dynamic smart contract component 902 via a user interface component 1212. These partners 1202a-1202c are now associated with the smart contract 922a.

At runtime, the IoT platform 914 sends IoT device data to this component 904, and the data is decrypted via a decryption module 1214. A validation module 1216 validates the IoT data and smart contract identifier. The IoT data includes the smart contract identifier, as well as the sender and receiver partner identifiers. The execution module 1218 executes the smart contract on the IoT data based on this extracted, decrypted, and verified information.

Figure 13:
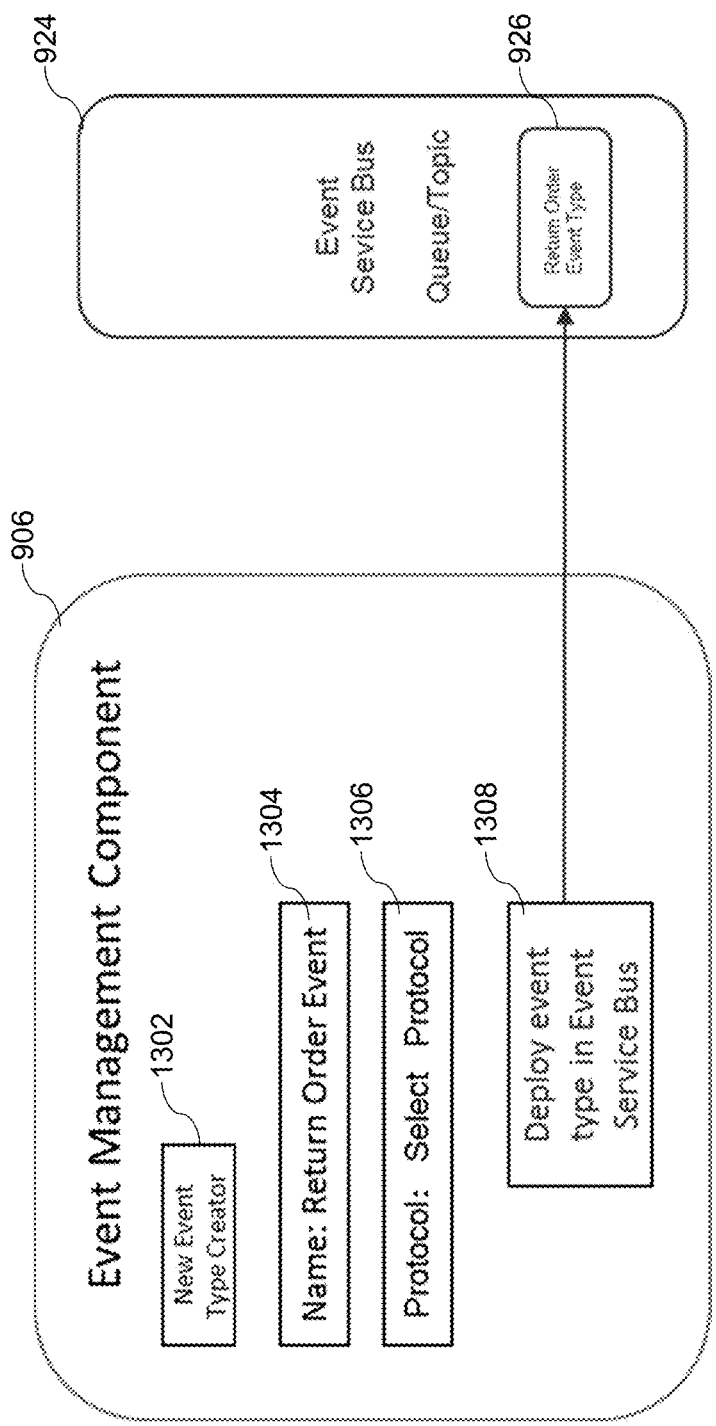
FIG. 13 provides further details concerning the event management component shown in FIG. 9, in accordance with certain example embodiments.

FIG. 13 provides further details concerning the event management component 906 shown in FIG. 9, in accordance with certain example embodiments. The event management component 906 creates new event types relevant to the business process, e.g., using the new event creator 1302. The user selects new event types to be created in the event service bus 924 based on the new protocol created in the dynamic smart contract component 902, as described above.

The user thus is able to specify new event types in terms of a name 1304 and a protocol 1306. The event types are deployed to the event service bus 924 via a deployment module 1308. Once deployed, the event types can be subscribed to using the publish/subscribe model, or a variant thereof. For instance, the return order event type 926 and/or other event type(s) 928 can be deployed as a queue and/or topic that can be subscribed to, as set forth in greater detail below.

These event types are the shown in the automated BPMS process component 908. This enables the user to assign events associated with the event types to the business process, e.g., in creating an automated BPMS. For instance, a business process may indicate what to do with when event data indicating a contract breach is detected. FIG. 14 provides example event data in this regard. Via the BPMS process component 908, the user can specify that an event similar to that shown in FIG. 14 should cause a return order process to be executed, etc., e.g., in accordance with the FIG. 4 flowchart and description provided above.

Figure 15:
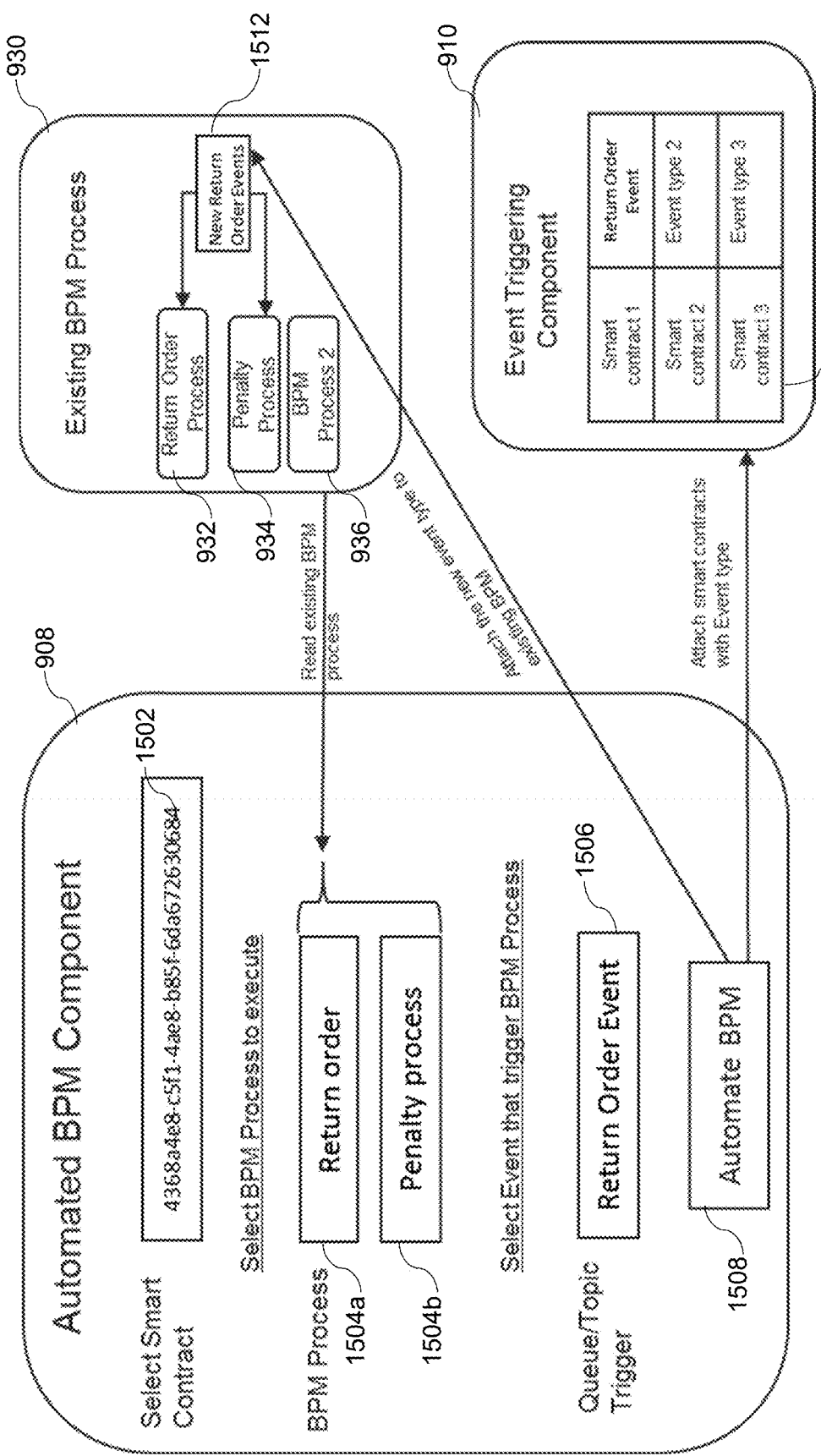
FIG. 15 provides further details concerning the automated BPM process component shown in FIG. 9, in accordance with certain example embodiments.

FIG. 15 provides further details concerning the automated BPM process component 908 shown in FIG. 9, in accordance with certain example embodiments. The automated BPM process component 908 is a designer used to map smart contracts with the BPMS process to be executed. In this component 908, the user can select the smart contract that needs to be assigned to the BPMS, e.g., from a list of available smart contracts 1502. The user interface presents a list of existing BPM processes 1504a-1504b, and the user can select more than one existing BPM process for the selected smart contract. The user maps or otherwise associates the smart contract with the BPM process. The user specifies one or more event types that is/are created by the event management component 906 for the new protocol generated in dynamic smart contract component 902. In the FIG. 15 example, the return order event type 1506 is specified as a queue/topic trigger used in connection with the messaging.

When the automate BPM option 1508 is selected, the selected event type 1506 is associated with the BPM process and the relevant smart contracts. With respect to the former, the existing BPM process 930 is able to store the association between the new return order events 1512 and the specific processes (or process steps). With respect to the latter, the smart contract and event types are associated with one another and sent to the event trigger component 910, where they may be stored in association with each other (e.g., in a table 1510 or the like). These operations are performed at design time but, once completed, the BPM's process is able to run automatically.

At runtime, the BPM process starts listening for new events of the specified types and, when a new event is triggered, the BPM process will be executed, e.g., in connection with the event triggering component 910, discussed in greater detail below. It will be appreciated that it is quite easy to associate an existing BPM's process with the dynamic blockchain smart contracts disclosed herein for automated performance of the process, triggering of compliance checks by the blockchain, etc.

Figure 16:
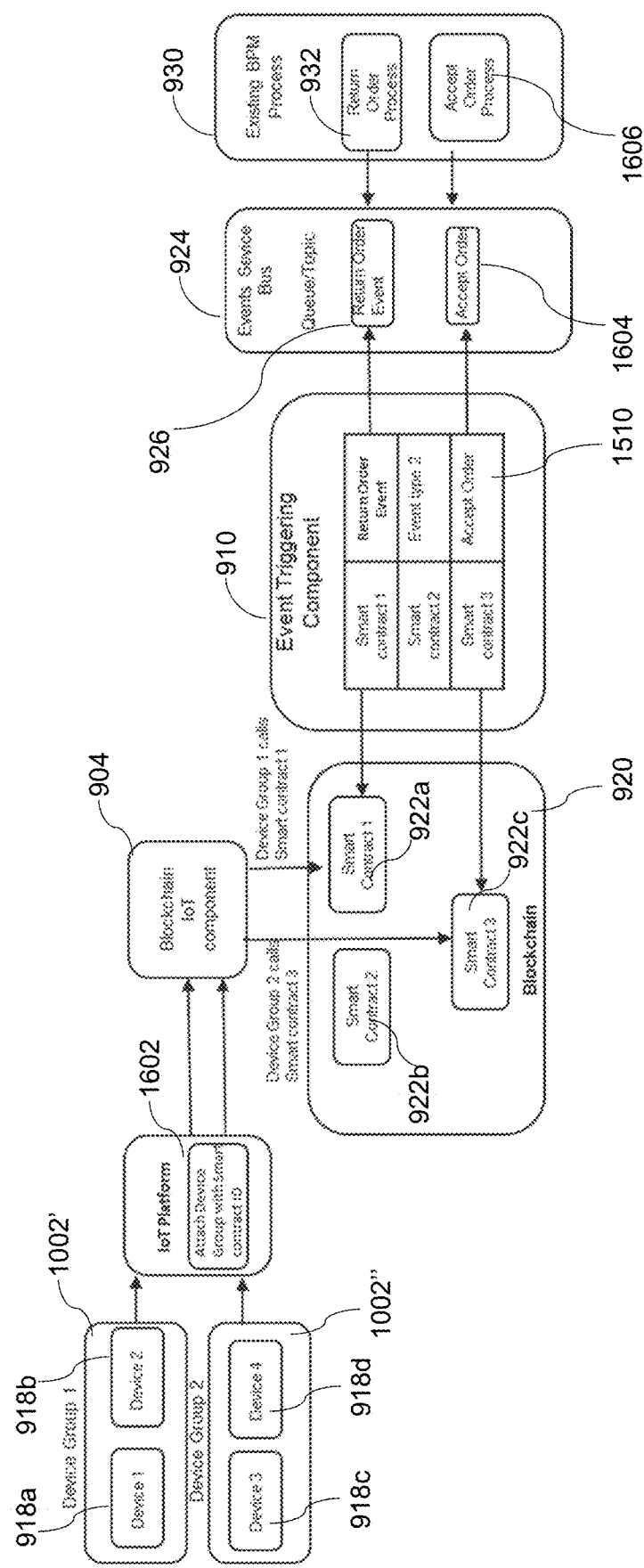
FIG. 16 is provides further details concerning the event triggering component 910 shown in FIG. 9, in accordance with certain example embodiments.

FIG. 16 provides further details concerning the event triggering component 910 shown in FIG. 9, in accordance with certain example embodiments. As shown in FIG. 16, devices 918a-918b belong to a first device group 1002', and devices 918c-918d belong to a second device group 1002". The first and second device groups 1002' and 1002" send IoT data to IoT platform 914. The IoT platform 914 associates 1602 the smart contract identifier with the IoT data, based on the device group and smart contract identifier mapping performed by the dynamic smart contract component 902. The blockchain IoT component 904 receives the IoT data, and it triggers its related smart contract in blockchain 920. In this example, the first device group 1002' calls the first smart contract 1 922a, and the second device group calls the third smart contract 922c.

The event triggering component 910 listens to emitted smart contract events. The first smart contract 922a triggers the return order event 926, and the third smart contract 922c triggers the accept order event 1604, e.g., based on the store 1510 established by the automated BPM process component 908. When there is an event triggered in the blockchain 920, the event triggering component 910 sends the appropriate message to event service bus 924. The BPMS process 930 listens to the events registered by the automated BPM process component 908. Thus, when the new event happens, relevant BPMS process are triggered. In this case, the return order event type 926 triggers the return order process 932, and the accept order event type 1604 triggers the accept order process 1606.

It thus will be appreciated that the blockchain cloud component includes the event triggering component 910, which listens for blockchain smart contract events (e.g., relating to a breach in contract, acceptance of an order, etc.) and publishes events to the event service bus 924 so that those events can be picked up by the existing BPM process 930, e.g., to in turn trigger automated BPM processes.

Figure 17:
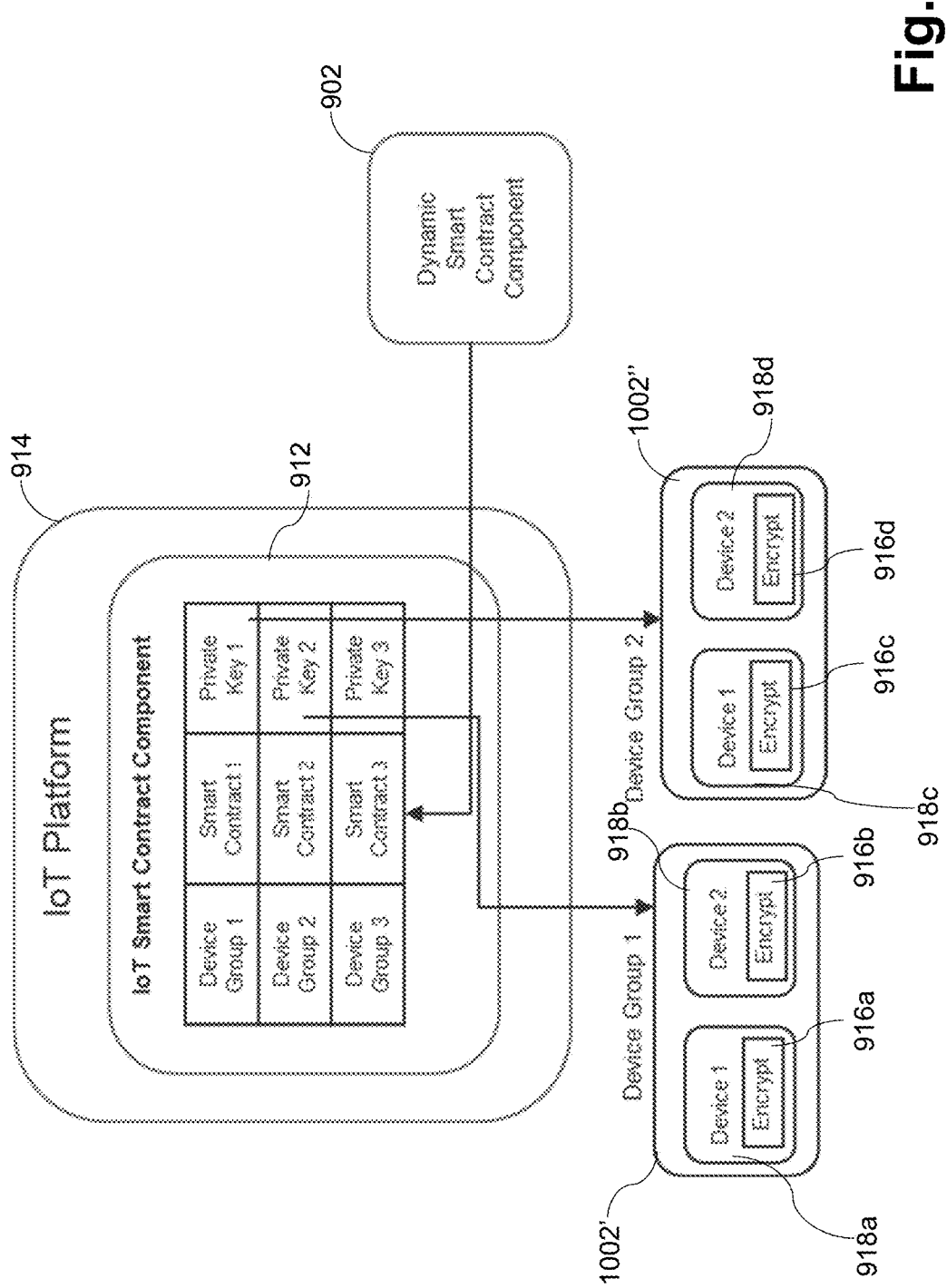
FIG. 17 provides further details concerning the IoT platform shown in FIG. 9, in accordance with certain example embodiments.

FIG. 17 provides further details concerning the IoT platform 914 shown in FIG. 9, in accordance with certain example embodiments. The IoT platform 914 includes the IoT smart contract component 912, which in general helps manage associations between the device group(s), smart contract(s), and private key(s). This information may be stored to a data store of the IoT platform 914 in certain example embodiments. The IoT platform 914 also stores blockchain IoT component connectivity information so that IoT data can be sent as appropriate.

In the case of FIG. 17, the IoT platform 914 has a mapping between the first and second device groups 1002' and 1002" with the first, second, and third smart contract identifiers 922a-922c. The dynamic smart contract component 902 sends an activate message to the IoT platform 914 to activate the device groups with the smart contracts being activated. The IoT platform 914 generates private keys for the device groups/smart contract pairings that have been activated, and the private keys are distributed to the device groups that will be used for encrypting the IoT data. Here, the first through fourth devices 918a-918d respectively include encrypt/decrypt modules 916a-916d.

Figure 18:
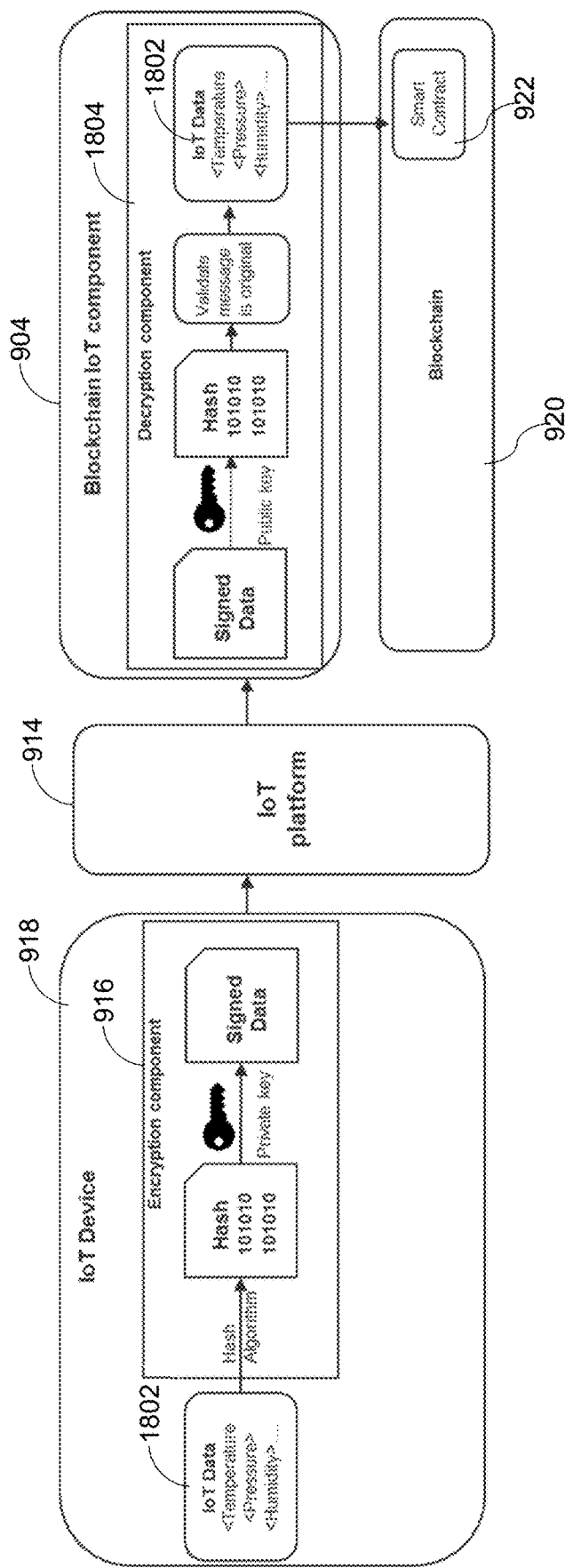
FIG. 18 is a block diagram showing how an IoT device may use an encryption component to securely transmit IoT related data, in accordance with certain example embodiments.

The IoT data is secured with an encryption component library provided to the IoT devices. FIG. 18, for example, is a block diagram showing how a single IoT device 918 may use an encryption component 916 to securely transmit IoT related data, in accordance with certain example embodiments. The IoT devices that send data have this encryption component 916, as well as the private key sent from the IoT smart contract component 912. In FIG. 18, the data 1802 is sent in new protocol standard. Thus, the IoT data is hashed using a hash algorithm (e.g., DES, MD5, and/or the like), and the hashed value is transmitted along with data 1802 to the IoT platform 914 after being signed with the private key.

Once the secure IoT data (which is signed and includes the hash value of the original data) reaches the blockchain IoT component 904, the decryption component 1804 thereon begins executing. The signed data is decrypted with the public key, and the IoT data hash and decrypted data is verified to determine whether it is original or has been tampered with. After verification of the IoT data, the blockchain IoT component 904 sends it to the blockchain 920 for the smart contract to start executing on it. The IoT data has the smart contract identifier that needs to be executed and, thus, the blockchain 920 is able to locate and execute the correct smart contract 922.

It will be appreciated that the signing discussed herein may be performed in connection with a private key (e.g., of the relevant party or parties) in certain example embodiments. This may apply to the signing of the smart contract, the IoT-related messages, etc. Further details about how "digital signatures" and/or the like can be implemented are provided below.

Figure 19:
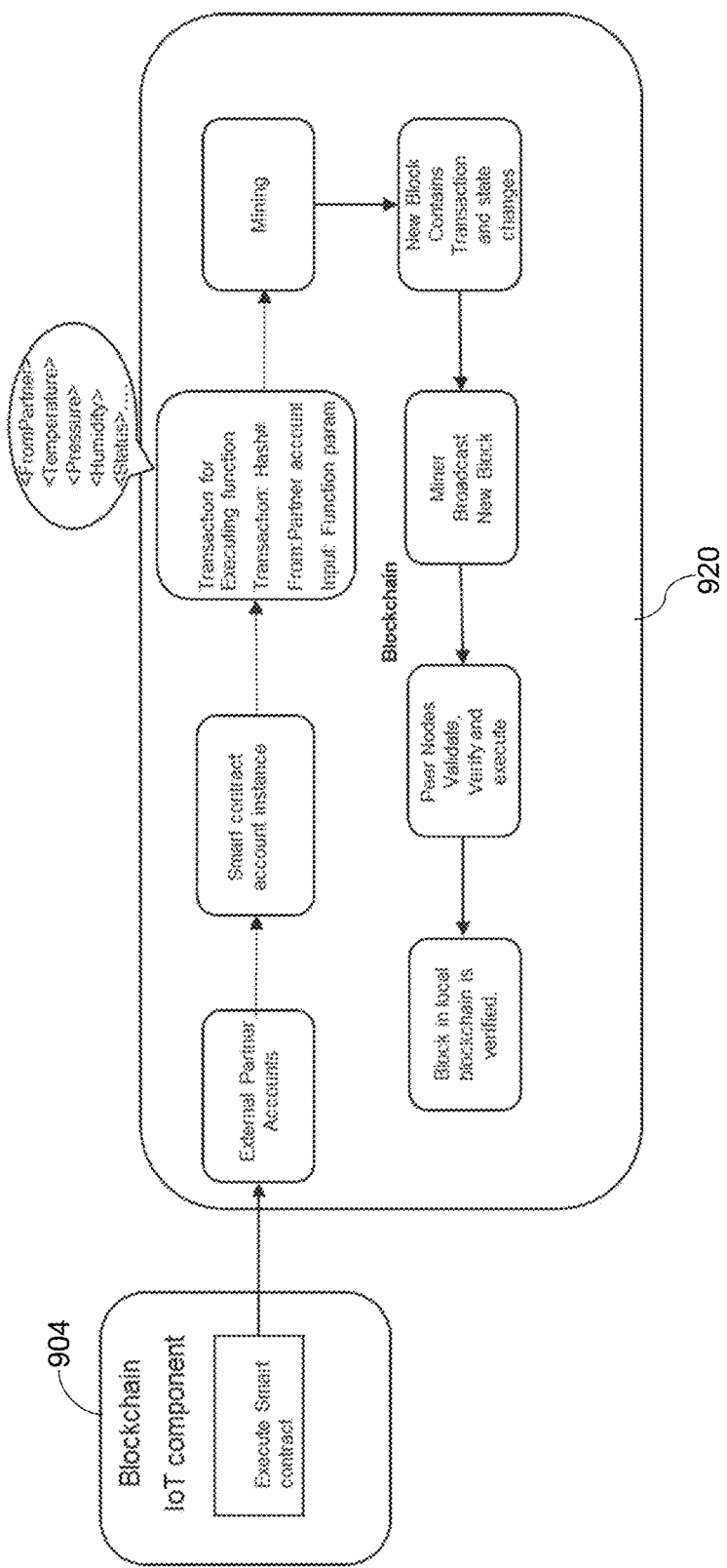
FIGS. 19-20 provide further details regarding how transactions happen inside the blockchain, in accordance with certain example embodiments.
Figure 20:
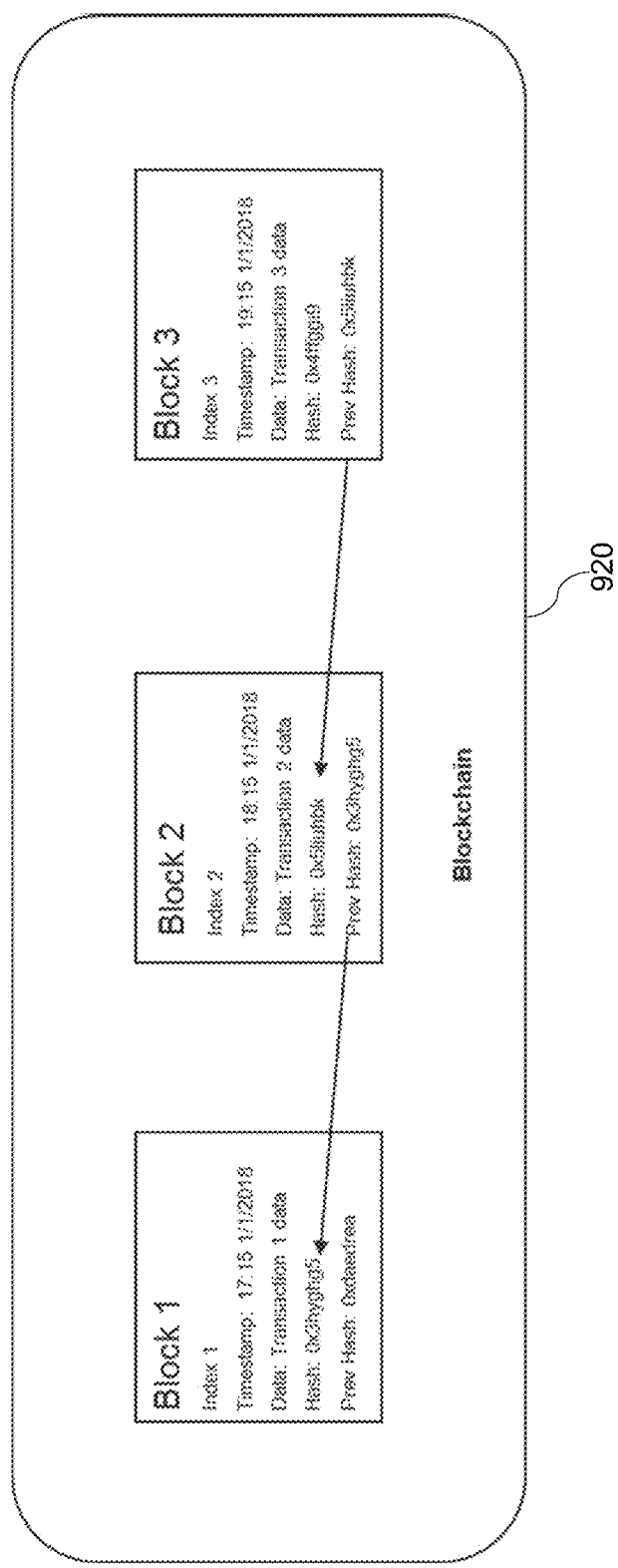

FIGS. 19-20 provide further details regarding how transactions happen inside the blockchain, in accordance with certain example embodiments. Smart contracts in general include functions that can be executed by an external account, which in this case can be any partner that is registered with the blockchain. A smart contract is triggered by the blockchain IoT component 904, which relays the sender and receiver partner identifiers along with the IoT data. It will be appreciated that these external account identifiers would change, based on the current "ownership" (or "custody") of the package. The blockchain IoT component 904 sends the transactions to the smart contract address, together with the partner "from address" and function parameters such as, for example, timestamp, temperature, pressure, package status, etc. The transaction is mined so that it can take effect. On successful mining by a node, a new block in the blockchain is created, and the new block contains the transaction. The mining node broadcasts the new block to peer nodes, as shown in FIG. 19. The new block will be validated and verified, and its transaction will be executed locally by peer nodes to be become an official block in their local blockchains. FIG. 20 shows the blocks being added. Any suitable framework for deploying and accessing smart contracts (such as, for example, the Ethereum Blockchain framework) may be used.

As indicated above, the IoT data sent from a device to the IoT platform 914 is encrypted and/or signed using digital signatures or the like. In this sense, a digital signature may be a mathematical scheme that can be used to demonstrate the authenticity of a message. Digital signatures employ a type of asymmetric cryptography in certain example embodiments. For messages sent through a non-secure channel, a properly implemented digital signature provides the receiver a reason to believe that the message was sent by the claimed sender. In certain example embodiments, three algorithms may be used to implement a digital signature scheme, namely, (1) a key generation algorithm that generates a private and public key, such as, for example, the RSA Crypto generator; (2) a signing algorithm that, given a message and a private key, produces a signature; and (3) a signature verifying algorithm that, given a message, public key, and a signature, either accepts or rejects the message's claim to authenticity.

Using a public key algorithm such as RSA, for example, one can generate two keys, one private and one public, that are mathematically linked. To create a digital signature, the signing algorithm creates a one-way hash of the IoT electronic data to be signed, e.g., using the SHA256 or other hash function. The private key is then used to encrypt the hash. This private key is sent from the IoT platform 914 to the devices. The encrypted hash along with other information, such as the hashing algorithm, is considered the digital signature. The reason for encrypting the hash instead of the entire message or document is that a hash function can convert arbitrary input into a fixed length value, which is usually much shorter. This saves time, as hashing is much faster than signing. The signed message is transmitted through the typically unsecure network to the IoT platform 914.

The value of the hash is unique to the hashed data. Any change in the data, even changing or deleting a single character, will result in a different value. This attribute enables others to validate the integrity of the data by using the signer's public key to decrypt the hash. The public key will be present in the blockchain IoT component 904. If the decrypted hash matches a second computed hash of the same data, it proves that the data has not changed since it was signed. If the two hashes do not match, the data has either been tampered with in some way (indicating an integrity problem), or the signature was created with a private key that does not correspond to the public key presented by the signer (indicating an authentication problem). FIG. 18 explains how this procedure can be implemented, and FIG. 20 shows each block in the blockchain including a (current) cryptographic hash value, as well as a hash value that corresponds to the prior link. By providing previous hash values, the "chain" of "blocks" can be maintained and trusted.

Without the automated BPMS process of certain example embodiments, the vaccine package transported between the various parties would be manually audited, e.g., when reached each successive party. The parties would manually trigger the BPMS process to accept or return the order. In such cases, it can be difficult to tell who breached the contract, e.g., if there are conflicts between the parties. Moreover, breaches may not be detected and intercepted in a timely manner. In addition, it is relatively straightforward to tamper with the temperature readings, given the number of manual processes involved. By contrast, with the new, secure and automated BPMS process, data from the IoT devices is maintained in the blockchain, which is immutable and can be authenticated. Thus, the data can be deemed trustworthy and accurate throughout the process, and proof of "who did what, when" can be provided in this trustable manner. There is no need for manual triggers of BPMS processes in at least some instances, as the IOT blockchain components are automatically triggered when there is a breach. This can dynamically alter the physical shipment of goods, saving time and streamlining processing, etc. There also is increased transparency, as all parties can monitor all steps involved in the process. Thus, the technical improvements of increased security, better authentication, more direct and automated dynamic action, cleaner and more trustworthy verifiable data, can be realized in this and other contexts.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

---

Code Appendix A: Example Solidity Smart Contract Code

---

```
pragma solidity ^0.4.4;
contract SupplyChain {
    struct EntityStruct {
        address entityAddress;
        string datetime;
        int temperature;
        string fromlocation;
        string tolocation;
        string status;
    }
    mapping (address=>EntityStruct) public entityStructs;
    event Notify(address entityAddress, string datetime, int
        temperature, string fromlocation, string tolocation, string
        status);
    function addEntity(
        address entityAddress,
        string datetime,
        int temperature,
        string fromlocation,
        string tolocation,
        string status)
    public returns(bool success) {
        entityStructs[entityAddress].entityAddress = entityAddress;
        entityStructs[entityAddress].datetime = datetime;
        entityStructs[entityAddress].temperature = temperature;
        entityStructs[entityAddress].fromlocation = fromlocation;
        entityStructs[entityAddress].tolocation = tolocation;
        entityStructs[entityAddress].status = status;
        if (temperature > 5) {
        entityStructs[entityAddress].status = "Inspect";
        Notify(entityAddress,datetime,temperature,fromlocation,
            tolocation, "Inspect");
        }
        return true;
    }
}
```

What is claimed is:

1. A distributed blockchain computing system, comprising:
   a computer storage system configured to store a blockchain;
   a transceiver configured to facilitate electronically-mediated communication, over a network, with a plurality of external computing systems operated by different respective participants, each said external computing system storing a copy of the blockchain of the distributed blockchain computing system and having associated therewith a computing device including at least one sensor, wherein the participants cooperate in performing a process that is modeled, in an external process modeling computer system, in connection with a plurality of modeled events that are linked together for the performed process; and
   a computer processing system including at least one hardware processor coupled to the computer storage system and the transceiver, the computer processing system being configured to:
   establish a device group identifying the respective computing devices involved in performing the process that is modeled;
   retrieve a plurality of parameters based on the established device group, the retrieved plurality of parameters provided in connection with the sensors of the computing devices identified in the device group that are related to performing the modeled process;
   dynamically generate, based on the retrieved plurality of parameters, one or more sets of executable code that include validation rules for processing data for the retrieved plurality of parameters;
   submit the dynamically generated one or more sets of executable code to the blockchain for incorporation therein;
   receive, based on submission of the dynamically generated one or more sets of executable code, an identifier for each said dynamically generated set of executable code; and
   map each said dynamically generated set of executable code with one or more of the modeled events of the process that is to be performed, wherein each said dynamically generated set of executable code is configured to selectively trigger, based on evaluation of the validation rules, the one or more modeled events mapped to the corresponding set of executable code, the one or more modeled events being triggered in the external process modeling system.

2. The distributed blockchain computing system of claim 1, wherein the computer processing system is further configured to:
   establish a plurality of different device groups;
   associate each of the different device groups with one or more of the different modeled events; and
   for each said device group, identify parameters provided by the sensors of the computing devices identified in the respective device group that are related to the associated modeled events.

3. The distributed blockchain computing system of claim 2, wherein each said set of executable code is associated with at least one of the plural different device groups.

4. The distributed blockchain computing system of claim 3, wherein each said set of executable code is executable only in response to the distributed blockchain computing system receiving, via the transceiver, an electronic message from one of the computing devices in the device group associated therewith.

5. The distributed blockchain computing system of claim 1, wherein the computer processing system is further configured to authorize which computing devices are operable to trigger execution of the one or more sets of executable code.

6. The distributed blockchain computing system of claim 1, wherein the external process modeling computer system is configured to store data for a plurality of different modeled processes that are performable in connection with different respective modeled events, and
   wherein different sets of executable code are applicable to each of the different modeled processes.

7. The distributed blockchain computing system of claim 1, wherein the transceiver is further configured to receive electronic data messages from the computing devices, the electronic data messages including values for the sensor(s) of the respective computing devices and being signed by the respective computing devices, and wherein the evaluation of the validation rules is performed based on information included in the electronic data messages.

8. The distributed blockchain computing system of claim 7, wherein the electronic data messages each include, as their respective signatures, an encrypted hash of at least the sensor value(s) therein.

9. The distributed blockchain computing system of claim 8, wherein the hashes are encrypted with private keys assigned to the respective transmitting computing devices.

10. The distributed blockchain computing system of claim 7, wherein the computer processing system is further configured to publish to an event bus, monitored by the external process modeling computer system, event messages resulting from the evaluation of the validation rules by the distributed blockchain computing system in order to cause the external process modeling computer system to selectively and automatically trigger the one or more modeled events mapped to the corresponding set of executable code.

11. The distributed blockchain computing system of claim 10, wherein the computer processing system is further configured to:
generate, based on the received electronic data messages, new blocks for the blockchain, the new blocks comprising transaction and state change information related to the process, which includes current and previous signature values; and
broadcast the new blocks to the computing systems for local validation and verification and, conditioned on the local validation and verification, updating of the copies of the blockchains thereon.

12. A computer-implemented method for use with a distributed blockchain computing system including a computer storage system and a computer processing system including at least one hardware processor, the method comprising:
storing, to the computer storage system, a blockchain;
facilitating electronically-mediated communication, over a network, with a plurality of external computing systems operated by different respective participants, each said external computing system storing a copy of the blockchain of the distributed blockchain computing system and having associated therewith a computing device including at least one sensor, wherein the participants cooperate in performing a process that is modeled, in an external process modeling system, in connection with a plurality of modeled events that are linked together for the performed process;
establishing a device group identifying the respective computing devices involved in performing the process that is modeled;
retrieving a plurality of parameters based on the established device group, the retrieved plurality of parameters provided in connection with the sensors of the computing devices identified in the device group that are related to performing the modeled process;
dynamically generating, based on the retrieved parameters, one or more sets of executable code that include validation rules for processing data for the retrieved parameters;
submitting the dynamically generated one or more sets of executable code to the blockchain for incorporation therein;
receiving, based on submission of the dynamically generated one or more sets of executable code, an identifier for each said dynamically generated set of executable code; and
mapping each said dynamically generated set of executable code with one or more of the modeled events of the process that is to be performed, wherein each said dynamically generated set of executable code is configured to selectively trigger, based on evaluation of the validation rules the one or more modeled events mapped to the corresponding set of executable code, the one or more modeled events being triggered in the external process modeling system.

13. The method of claim 12, further comprising:
establishing a plurality of different device groups;
associating each of the different device groups with one or more of the different modeled events; and
for each said device group, identifying parameters provided by the sensors of the computing devices identified in the respective device group that are related to the associated modeled events,
wherein each said set of executable code is associated with at least one of the plural different device groups.

14. The method of claim 12, further comprising authorizing which computing devices are operable to trigger execution of the one or more sets of executable code.

15. The method of claim 1, further comprising receiving electronic data messages from the computing devices, the electronic data messages including values for the sensor(s) of the respective computing devices and being signed by the respective computing devices, and
wherein the evaluation of the validation rules is performed based on information included in the electronic data messages.

16. The method of claim 15, wherein the electronic data messages each include, as their respective signatures, an encrypted hash of at least the sensor value(s) therein.

17. The method of claim 16, wherein the hashes are encrypted with private keys assigned to the respective transmitting computing devices.

18. The method of claim 15, further comprising publishing to an event bus, monitored by the external process modeling system, event messages resulting from the evaluation of the validation rules by the distributed blockchain computing system in order to cause the external process modeling system to selectively and automatically trigger the one or more modeled events mapped to the corresponding set of executable code.

19. The method of claim 12, further comprising:
generating, based on the received electronic data messages, new blocks for the blockchain, the new blocks comprising transaction and state change information related to the process, which includes current and previous signature values; and
broadcasting the new blocks to the computing systems for local validation and verification and, conditioned on the local validation and verification, updating of the copies of the blockchains thereon.

20. A non-transitory computer-readable storage medium tangibly storing a blockchain and process management program for use with a distributed blockchain computing system including a computer storage system, the program, when executed by a hardware processor, performing functionality comprising:
store, to the computer storage system, a blockchain;
facilitate electronically-mediated communication, over a network, with a plurality of external computing systems operated by different respective participants, each said external computing system storing a copy of the blockchain of the distributed blockchain computing system and having associated therewith a computing device including at least one sensor, wherein the participants cooperate in performing a process that is modeled, in an external process modeling system, in connection with a plurality of modeled events that are linked together for the performed process;

establish a device group identifying the respective computing devices involved in performing the process that is modeled;

identify a plurality of parameters based on the established device group, the retrieved plurality of parameters provided in connection with the sensors of the computing devices identified in the device group that are related to performing the modeled process;

dynamically generate, based on the identified parameters, one or more sets of executable code that include validation rules for the identified parameters;

communicate the dynamically generated one or more sets of executable code to the blockchain for deployment therein;

receive, based on submission of the dynamically generated one or more sets of executable code, an identifier for each said dynamically generated set of executable code, and map each said dynamically generated set of executable code with one or more of the modeled events of the process that is to be performed, wherein each said dynamically generated set of executable code is configured to selectively trigger, based on evaluation of the validation rules, the one or more modeled events mapped to the corresponding set of executable code, the one or more modeled events being triggered in the external process modeling system.

\* \* \* \* \*